United States Patent
Yamanaka et al.

(10) Patent No.: US 9,873,539 B2
(45) Date of Patent: Jan. 23, 2018

(54) RESIN-COATED METAL SHEET FOR CONTAINER AND METHOD FOR MANUFACTURING THE SAME

(71) Applicant: JFE STEEL CORPORATION, Tokyo (JP)

(72) Inventors: Yoichiro Yamanaka, Tokyo (JP); Junichi Kitagawa, Fukuyama (JP); Hiroki Nakamaru, Chiba (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 15/118,275

(22) PCT Filed: Feb. 17, 2015

(86) PCT No.: PCT/JP2015/000719
§ 371 (c)(1),
(2) Date: Aug. 11, 2016

(87) PCT Pub. No.: WO2015/125461
PCT Pub. Date: Aug. 27, 2015

(65) Prior Publication Data
US 2016/0355294 A1    Dec. 8, 2016

(30) Foreign Application Priority Data
Feb. 21, 2014  (JP) ................................. 2014-031207
Sep. 11, 2014  (WO) .................. PCT/JP2014/004715

(51) Int. Cl.
*B05D 1/16*    (2006.01)
*B05D 1/02*    (2006.01)
(Continued)

(52) U.S. Cl.
CPC .............. *B65D 1/165* (2013.01); *B05D 1/02* (2013.01); *B05D 1/28* (2013.01); *B05D 7/14* (2013.01);
(Continued)

(58) Field of Classification Search
None
See application file for complete search history.

(56) References Cited

U.S. PATENT DOCUMENTS

| 3,891,471 A | 6/1975 | Summers et al. |
| 2003/0031859 A1 | 2/2003 | Sinsel et al. |

(Continued)

FOREIGN PATENT DOCUMENTS

| CA | 2440334 A1 | 9/2002 |
| DE | 10204829 C1 | 7/2003 |

(Continued)

OTHER PUBLICATIONS

International Search Report and Written Opinion for International Application No. PCT/JP2015/000719, dated Apr. 21, 2015, 5 pages.
(Continued)

*Primary Examiner* — Tahseen N Khan
(74) *Attorney, Agent, or Firm* — RatnerPrestia

(57) ABSTRACT

Provided is a resin-coated metal sheet for a container having a resin layer (A) having a multi-layer structure containing polyester as a main component on an inner-surface side of the container when the metal sheet is formed into the container. The resin layer (A) contains terephthalic acid in an amount of 85 mol % or more, the resin layer (A) has at least two layers including an uppermost resin layer (a1) which comes into contact with contents and contains wax compounds in an amount of 0.10 mass % or more and 2.0 mass % or less with respect to the uppermost resin layer (a1), with respect to a Raman band of 1615 $cm^{-1}$ determined by performing Raman spectroscopy on the uppermost resin layer (a1), the maximum value of the peak intensity ratio ($I_{MD}/I_{ND}$) of peak intensity in a longitudinal direction to peak intensity in a thickness direction is 1.0 or more and 4.0 or less, a thickness of the uppermost resin layer (a1) is 0.5 μm or more and 10 μm or less, and a thickness of the resin (Continued)

layer (A) excluding the thickness of the uppermost resin layer (a1) is 5 μm or more and 20 μm or less.

22 Claims, 2 Drawing Sheets

(51) Int. Cl.

| | |
|---|---|
| B05D 1/28 | (2006.01) |
| B65D 1/16 | (2006.01) |
| B05D 7/14 | (2006.01) |
| B05D 7/00 | (2006.01) |
| B32B 1/00 | (2006.01) |
| B32B 15/00 | (2006.01) |
| B32B 15/04 | (2006.01) |
| B32B 15/08 | (2006.01) |
| B32B 27/00 | (2006.01) |
| B32B 1/02 | (2006.01) |

(52) U.S. Cl.
CPC .................. *B05D 7/54* (2013.01); *B32B 1/00* (2013.01); *B32B 1/02* (2013.01); *B32B 15/00* (2013.01); *B32B 15/04* (2013.01); *B32B 15/08* (2013.01); *B32B 27/00* (2013.01); *B05D 2252/10* (2013.01); *B32B 2255/00* (2013.01); *B32B 2255/06* (2013.01); *B32B 2439/00* (2013.01)

(56) References Cited

U.S. PATENT DOCUMENTS

| | | | |
|---|---|---|---|
| 2005/0129964 A1 | 6/2005 | Hugo | |
| 2007/0036995 A1* | 2/2007 | Suzuki | B32B 1/02 |
| | | | 428/458 |
| 2007/0142615 A1* | 6/2007 | Crawford | C08G 63/199 |
| | | | 528/272 |
| 2008/0261063 A1* | 10/2008 | Yamanaka | B32B 15/08 |
| | | | 428/483 |
| 2010/0112302 A1 | 5/2010 | Holzmuller et al. | |
| 2010/0243506 A1* | 9/2010 | Cleaver | B65D 25/14 |
| | | | 206/524.6 |
| 2013/0224413 A1* | 8/2013 | Prouvost | C08J 7/047 |
| | | | 428/35.8 |

FOREIGN PATENT DOCUMENTS

| | | |
|---|---|---|
| DE | 102007015393 A1 | 10/2008 |
| EP | 1688188 A1 | 8/2006 |
| JP | 2001328204 | 11/2001 |
| JP | 2002264260 | 9/2002 |
| JP | 2005205890 | 8/2005 |
| JP | 2005342910 | 12/2005 |
| JP | 2005342911 | 12/2005 |
| JP | 2006069211 | 3/2006 |
| JP | 2006205575 | 8/2006 |
| JP | 2006326902 | 12/2006 |
| JP | 2007055687 | 3/2007 |
| JP | 2007253454 | 10/2007 |
| JP | 2008188918 | 8/2008 |

OTHER PUBLICATIONS

Australian Examination Report for Australian Application No. 2015220290, dated Sep. 21, 2016, 2 pages.
Canadian Office Action for Application No. 2937215, dated Jul. 5, 2017, 11 pages.
Extended European Search Report for European Application No. 15752651.8, dated Feb. 20, 2017, 7 pages.

* cited by examiner

INNER SURFACE
SIDE OF CONTAINER

OUTER SURFACE
SIDE OF CONTAINER

CROSS-CUT SCRATCH MARK (REACHING BASE STEEL SHEET)

ROLLING DIRECTION OF STEEL SHEET

CORRODED PART

MAXIMUM CORROSION WIDTH ON ONE SIDE

RESIN-COATED METAL SHEET FOR CONTAINER AND METHOD FOR MANUFACTURING THE SAME

CROSS-REFERENCE TO RELATED APPLICATIONS

This is the U.S. National Phase application of PCT/JP2015/000719, filed Feb. 17, 2015 and claims priority to Japanese Patent Application No. 2014-031207, filed Feb. 21, 2014, and PCT/JP2014/004715, filed Sep. 11, 2014, the disclosures of each of these applications being incorporated herein by reference in their entireties for all purposes.

FIELD OF THE INVENTION

The present invention relates to a resin-coated metal sheet for a container which is used for, for example, can bodies, lids, and the like of food cans and a method for manufacturing the metal sheet.

BACKGROUND OF THE INVENTION

Conventionally, metal sheets such as tin free steel (TFS) sheets and aluminum sheets which are the materials for metal cans used as food cans have been painted in order to increase, for example, corrosion resistance, durability, and weather resistance. However, in the case of such painting techniques, there is a problem not only in that a baking process is complex but also in that a very long treatment time is needed and in that a large amount of solvent is discharged.

Therefore, in order to solve such problems, as an alternative to a painted metal sheet, a resin-coated metal sheet, which is manufactured by forming a laminated film of thermoplastic resin on a heated metal sheet, has been developed, and such a metal sheet is now widely used in industries mainly as a material for beverage cans.

However, in the case where a resin-coated metal sheet is used for food cans, since a portion of the contents strongly adheres to the inner surface of the container when the contents are taken out from the container, there is a problem in that it is difficult to take the contents out. Such a problem, which is closely related to the buying motivation of consumers, is a very important issue from the viewpoint of achieving the buying motivation of consumers. Nevertheless, in the case of conventional resin-coated metal sheets, very little consideration has been given to an improvement in the ease of taking contents out.

Therefore, the present inventors diligently conducted investigations in order to achieve a satisfactory content release property, and, as a result, found that it is possible to achieve good properties by adding a specific wax to a polyester resin so that the wax exists on the surface of the resin in the case of contents (such as a mixture of meat, egg, and carbohydrate) containing a large amount of fatty components, and filed Patent Literature 1.

In addition, the present inventors, from the results of subsequent investigations, made improvements in order to achieve an excellent content release property even in the case of contents (such as luncheon meat) having a high protein content and strong adhesiveness, and filed Patent Literature 2 and Patent Literature 3.

CITATION LIST

Patent Literature

PTL 1: Japanese Unexamined Patent Application Publication No. 2001-328204

PTL 2: Japanese Unexamined Patent Application Publication No. 2007-55687

PTL 3: Japanese Unexamined Patent Application Publication No. 2008-188918

SUMMARY OF THE INVENTION

However, in the case of the technique according to Patent Literature 1, in some cases, the achieved content release property was insufficient for contents such as luncheon meat and tuna, which have a high protein content, due to their strong adhesiveness.

In the case of the technique according to Patent Literature 2, it is possible to achieve an excellent content release property for contents having a high protein content and strong adhesiveness. However, in order to stably achieve excellent performance, it is necessary to add a low-energy material containing many hydrophobic groups in an amount of about 10 mass % to 25 mass % to a resin layer which comes into direct contact with the contents. Since it is necessary to use a comparatively large amount of additive agent, there is a limitation on the chemical composition of the resin layer, and it is necessary to form plural resin layers. Therefore, since mismatching among the resin layers is inevitable, there is room for improvement in the adhesiveness among the layers. Also, in the case of the technique according to Patent Literature 3, as is the case with Patent Literature 2, plural resin layers are formed and a fatty acid amide in an amount of 15 mass % to 20 mass % is added to the uppermost resin layer which comes into contact with the contents in order to achieve an excellent content release property, and there is room for improvement in the adhesiveness among resin layers.

The present invention has been completed in order to solve the problems described above, and an object of the present invention is to provide a resin-coated metal sheet for a container with which it is possible to achieve excellent release property for various contents and to stably satisfy various properties required for a material for a container and a method for manufacturing the metal sheet.

The present inventors diligently conducted investigations in order to solve the problems described above, and, as a result, found that, by focusing on a resin layer (A), which is to be on the inner-surface side of a container after a resin-coated metal sheet for a container has been formed into a container, by adding wax compounds to an uppermost resin layer (a1) which is included in the resin layer (A) and comes into contact with the contents, and by controlling the crystal structure of the uppermost resin layer (a1), it is possible to provide a resin-coated metal sheet for a container satisfying requirements of excellent content release property and other required properties (adhesiveness, formability, corrosion resistance, and so forth).

The present invention has been completed on the basis of the knowledge described above, and the subject matter of the present invention includes the following.

[1] A resin-coated metal sheet for a container including a metal sheet and a resin layer (A) having a multi-layer structure containing polyester as a main component on an inner-surface side of the container when the metal sheet is formed into the container, in which 1) the resin layer (A) contains terephthalic acid in an amount of 85 mol % or more, 2) the resin layer (A) has at least two layers including an uppermost resin layer (a1) which comes into contact with contents and contains wax compounds in an amount of 0.10 mass % or more and 2.0 mass % or less with respect to the uppermost resin layer (a1), 3) with respect to a Raman band of 1615 cm$^{-1}$ determined by performing Raman spectroscopy on the uppermost resin layer (a1), the maximum value of the ratio ($I_{MD}/I_{ND}$) of peak intensity ($I_{MD}$) in a longitudinal direction to peak intensity ($I_{ND}$) in a thickness direction is 1.0 or more and 4.0 or less, 4) a thickness of the uppermost resin layer (a1) is 0.5 μm or more and 10 μm or less, and 5) a thickness of the resin layer (A) excluding the thickness of the uppermost resin layer (a1) is 5 μm or more and 20 μm or less.

[2] The resin-coated metal sheet for a container according to item [1] above, wherein the wax compounds contain a carnauba wax.

[3] The resin-coated metal sheet for a container according to item [1] or [2] above, further including a resin layer (B) having a multi-layer structure containing polyester as a main component on an outer-surface side of the container when the metal sheet is formed into the container, in which a resin layer (b1) which comes into contact with the metal sheet contains components described in (I) through (V) below.

(I) A polyester resin (II) A phenol resin (III) A metal alkoxide-based compound and/or metal chelate compound (IV) An epoxy resin and (V) at least One selected from the group consisting of a polyamine resin, a polyamide amine resin, and a polyamide resin

[4] The resin-coated metal sheet for a container according to item [3] above, wherein the resin layer (B) has the resin layer (b1) and a polyester film (b2) formed on the resin layer (b1).

[5] The resin-coated metal sheet for a container according to item [3] or [4] above, wherein contents of the resin components of the resin layer (b1) satisfy the conditions below.

(I) Polyester resin: 50 mass % or more and 89 mass % or less (II) Phenol resin: 10 mass % or more and 45 mass % or less (III) Metal alkoxide-based compound and/or metal chelate compound: 0.01 mass % or more and 10 mass % or less (IV) Epoxy resin: 0.5 mass % or more and 20 mass % or less, and (V) at least One selected from the group consisting of a polyamine resin, a polyamide amine resin, and a polyamide resin: 0.1 mass % or more and 10 mass % or less

[6] The resin-coated metal sheet for a container according to item [4] or [5] above, wherein a resin in the resin layer (b2) is a composition derived by mixing a polyester (i) containing polyethylene terephthalate or copolymerized polyethylene terephthalate containing less than 6 mol % of copolymerization components and a polyester (ii) containing polybutylene terephthalate or copolymerized polybutylene terephthalate containing less than 5 mol % of copolymerization components, and wherein a content of the polyester (i) is 60 mass % or less and a content of the polyester (ii) is 40 mass % or more.

[7] The resin-coated metal sheet for a container according to any one of items [3] to [6] above, wherein the resin layer (B) contains wax compounds in an amount of 5.0 mass % or less with respect to the resin layer (B).

[8] The resin-coated metal sheet for a container according to item [7] above, wherein the resin layer (B), the resin layer (b1) excluding the uppermost layer and the uppermost resin layer (b2) contain wax compounds or the uppermost resin layer (b2) contains wax compounds, and in which the uppermost resin layer (b2) contains wax compounds in an amount of 5.0 mass % or less with respect to the uppermost resin layer (b2).

[9] The resin-coated metal sheet for a container according to item [7] or [8] above, wherein the wax compounds contain a carnauba wax.

[10] A method for manufacturing the resin-coated metal sheet for a container according to any one of items [1] to [9] above, including determining resin layer forming conditions such that, with respect to a Raman band of 1615 cm$^{-1}$ determined by performing Raman spectroscopy on the uppermost resin layer (a1), the maximum value of the ratio ($I_{MD}/I_{ND}$) of peak intensity ($I_{MD}$) in a longitudinal direction to peak intensity ($I_{ND}$) in a thickness direction is 1.0 or more and 4.0 or less.

According to the present invention, it is possible to obtain a resin-coated metal sheet for a container having excellent release property for various contents. In addition, the resin-coated metal sheet for a container according to the present invention can stably satisfy requirements regarding many properties required for a material for food cans.

DETAILED DESCRIPTION OF EMBODIMENTS OF THE INVENTION

Figure 1:
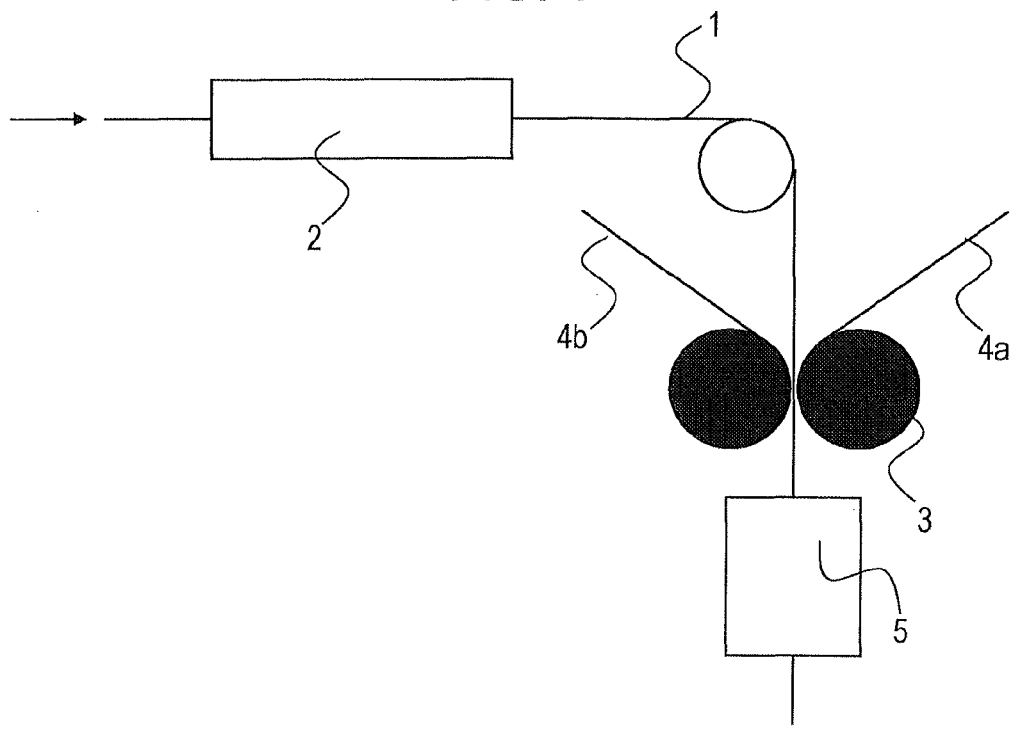
FIG. 1 is a diagram illustrating the main parts of a laminating apparatus for a metal sheet (Example 1).

Hereafter, embodiments of a resin-coated metal sheet for a container according to the present invention will be described in detail.

First, embodiments of the metal sheet used in the present invention will be described.

Examples of a metal sheet which may be used in the present invention include an aluminum sheet and a mild steel sheet, which are widely used as materials for cans. In particular, for example, a surface-treated steel sheet (a so-called TFS), on which a two-layer film consisting of an under layer composed of metal chromium and an upper layer composed of chromium hydroxide is formed, is the most appropriate.

Although there is no particular limitation on the coating weights of a metal chromium layer and a chromium hydroxide layer of TFS, it is preferable that the coating weight of a metal chromium layer be 70 mg/m$^2$ to 200 mg/m$^2$ and the coating weight of a chromium hydroxide be 10 mg/m$^2$ to 30 mg/m$^2$ in terms of Cr in each case from the viewpoint of adhesiveness and corrosion resistance after working has been performed.

[Chemical Composition of a Resin Layer (A), which is to be on the Inner-Surface Side of a Container]

In embodiments of the present invention, the metal sheet has a resin layer (A) having a multi-layer structure containing polyester as a main component on the inner-surface side of the container when the metal sheet is formed into the container. This resin layer (A) is characterized by a polymer containing dicarboxylic acid components and glycol components and containing terephthalic acid as a dicarboxylic acid component in an amount of 85 mol % or more. In the case where the amount of terephthalic acid is less than 85 mol %, since there is a decrease in the melting point of the resin, the resin is softened due to frictional heat when the container is formed, which raises concern that defects such as film shaving may occur. Also, when a retort sterilization treatment is performed after a container has been formed, since the resin layer is attacked by water vapor, there may be a decrease in adhesiveness in a wet environment.

Examples of dicarboxylic acid components other than terephthalic acid include aromatic dicarboxylic acids such as isophthalic acid, naphthalene dicarboxylic acid, diphenyldicarboxylic acid, sodium 5-sulfoisophthalic acid, and phthalic acid, aliphatic dicarboxylic acids such as oxalic acid, succinic acid, adipic acid, sebacic acid, dimer acid, maleic acid, and fumaric acid, alicyclic dicarboxylic acids such as cyclohexanedicarboxylic acid, and oxycarboxylic acids such as p-oxybenzoic acid.

Examples of glycol components include aliphatic glycols such as ethylene glycol, propanediol, butanediol, pentanediol, hexanediol, and neopentyl glycol, alicyclic glycols such as cyclohexanedimethanol, and aromatic glycols such as bisphenol A and bisphenol S. In particular, ethylene glycol is preferable among such glycol components. Here, two or more of these dicarboxylic acid components or two or more of these glycol components may be used in combination.

[Wax Compound]

In addition, in embodiments of the present invention, the resin layer (A) is characterized by at least two layers, in which the uppermost resin layer (a1), which comes into contact with the contents, contains wax compounds in an amount of 0.10 mass % or more and 2.0 mass % or less with respect to the uppermost resin layer (a1). Since the wax compounds are added in order to decrease the surface free energy of the resin layer (A), the contents are less likely to adhere to the resin layer (A) as a result of wax compounds being added, which results in an increase in content release property. The reason why the amount of the wax compounds is limited to 0.10 mass % or more is because, since the above-described effect is insufficient in the case where the amount is less than 0.10 mass %, there is a decrease in content release property. In addition, the reason why the amount of the wax compounds is limited to 2.0 mass % or less is because, since it is technically difficult to form a film in the case where the amount is more than 2.0 mass %, there is a decrease in productivity and an increase in cost. Here, although there is no particular limitation on whether or not wax compounds are added to the resin layers other than the uppermost layer, it is preferable that the amount be 2.0 mass % or less in the case where wax compounds are added. However, since there is a case where the effect of increasing content release property is not realized even in the case where wax compounds are added to the resin layers other than the uppermost layer, it is effective to add wax compounds to only the uppermost layer.

Examples of the chemical compositions of wax compounds which may be used include organic and inorganic lubricants. In particular, a carnauba wax, which is a kind of vegetable wax and a natural wax, can preferably be used. It is possible to manufacture a polyester resin containing a carnauba wax by using an ordinary manufacturing method after having mixed polyester with a specified amount of wax.

[Crystal Structure of Resin Layer (a1)]

Moreover, the uppermost resin layer (a1) is characterized in that, with respect to a Raman band of 1615 cm$^{-1}$ ($I_{1615}$) determined by performing Raman spectroscopy on the uppermost resin layer (a1), the maximum value of the ratio ($I_{MD}/I_{ND}$) of peak intensity ($I_{MD}$) in the longitudinal direction (in the direction parallel to the surface of the resin layer (a1)) to peak intensity ($I_{ND}$) in the thickness direction (in the direction perpendicular to the surface of the resin layer (a1)) is 1.0 or more and 4.0 or less.

Here, $I_{1615}$ is the highest peak of the Raman band due to C=C stretching in a benzene ring of a polyester resin in a range of 1615 cm$^{-1}$±10 cm$^{-1}$ determined by performing Raman spectroscopy. There is a tendency for the peak intensity of the Raman band of $I_{1615}$ to increase with an increasing degree of orientation as a result of polyester molecular chains being aligned with each other. Therefore, in the case where there is an increase in the peak intensity ratio ($I_{MD}/I_{ND}$) of a Raman band, a structure in which polyester molecular chains are oriented in the surface direction of the resin layer (a1) to a higher degree is formed. On the other hand, in the case where there is a decrease in the peak intensity ratio ($I_{MD}/I_{ND}$) of a Raman band, there is a decrease in the orientation degree of polyester molecular chains in the surface direction of the resin layer (a1).

From the results of investigations conducted by the present inventors, it was found that, by controlling the oriented structure of polyester molecular chains in the resin layer (a1) as described above, there is a significant increase in content release property. The reason for this will be described hereafter.

In the case where polyester molecular chains, which are the main components of the resin layer (a1), form an oriented structure, since the crystal lattice of a wax compound such as a carnauba wax added in the resin layer (a1) is larger than the distance between the molecular chains, the wax compound cannot exist in the oriented structure. Therefore, the wax compound exists only in the non-oriented structure of polyester molecular chains. The glass-transition temperature (Tg) (° C.) of a polyester resin contained in the resin layer (a1) is about 70° C., and, since the movement of molecular chains is frozen at a temperature equal to or lower than this temperature, wax compounds are also fixed in the non-oriented structure. Therefore, in a process in which a container is formed, contents are packed into the container, and the container is sealed, the structure of the resin layer (a1) is stable, and wax compounds stay in the non-oriented structure in the resin layer (a1). However, when the container is heated to a temperature of about 120° C. to 130° C. in a retort sterilization treatment process, since the molecular chains forming the non-oriented structure of a polyester resin start exhibiting micro-Brownian motion, wax compounds start moving among the polyester molecular chains due to the motion. Since the surface free energy of wax compounds is lower than that of a polyester resin, wax compounds diffuse to the surface of the resin layer (a1) and are concentrated there. Therefore, there is a decrease in the surface free energy of the resin layer (a1), which results in an increase in content release property. By promoting the concentration of wax compounds on the surface of the resin layer (a1), there is an increase in content release property.

In order to promote the surface concentration of wax compounds, it is necessary to control the oriented structure of a polyester resin contained in the resin layer (a1). That is, it is necessary to form an oriented structure through which wax compounds in the resin layer (a1) can smoothly diffuse to the surface of the resin layer (a1). From the results of investigations conducted by the present inventors, it was found that, in the case where there is an increase in the amount of polyester molecule chains aligned in the direction parallel to the surface direction of the resin layer (a1) so that there is an increase in the degree of orientation, there is a significant decrease in the amount of wax compounds concentrated on the surface. This is because, since the molecular chains are aligned in a direction perpendicular to the diffusion direction of wax compounds, the molecular chains function as diffusion barriers. On the other hand, the polyester molecular chains aligned in such a manner also function as barrier layers against water vapor, which causes retort-blushing, and against, for example, chlorine ions, water, and oxygen, which cause corrosion. Therefore, it is necessary to control the degree of orientation of polyester molecular chains in the surface direction of the film to be within a range in which the required properties are well balanced. Therefore, with respect to a Raman band of 1615 $cm^{-1}$ determined by performing Raman spectroscopy, the maximum value of the ratio ($I_{MD}/I_{ND}$) of peak intensity ($I_{MD}$) in the longitudinal direction to peak intensity ($I_{ND}$) in the thickness direction is set to be 1.0 or more and 4.0 or less.

By controlling the maximum value of the peak intensity ratio to be within the range described above, it is possible to achieve excellent content release property as a result of the surface concentration of wax compounds smoothly taking place while it is possible to achieve sufficient barrier capability against water vapor and corrosion factors. In the case where the maximum value of the peak intensity ratio ($I_{MD}/I_{ND}$) is less than 1.0, since there is a decrease in barrier capability due to an insufficient degree of orientation, there is concern of retort-blushing occurring or of a decrease in corrosion resistance. Conversely, in the case where the maximum value of the peak intensity ratio ($I_{MD}/I_{ND}$) is more than 4.0, since the surface concentration of wax compound is inhibited due to the excessive degree of orientation, it is not possible to achieve sufficient content release property.

[Thickness (Average Film Thickness) of Resin Layer (a1)]

The thickness of the resin layer (a1) is set to be 0.5 µm or more and 10 µm or less. Since the amount of wax compounds added is limited to 2.0 mass % or less with respect to the resin layer (a1), the amount of wax is insufficient in the case where the thickness of the resin layer (a1) is less than 0.5 µm, which results in sufficient content release property not being achieved. On the other hand, in the case where the thickness is more than 10 µm, since the proportion of the resin layer (a1) to the resin layer (A) is excessively large, there may be a decrease in the adhesiveness of the resin layer (A) to a metal sheet or in the properties of the resin layer (A) such as formability and corrosion resistance. Therefore, the thickness of the resin layer (a1) is set to be 0.5 µm or more and 10 µm or less.

[Thickness (Average Film Thickness) of Resin Layer (A) Excluding Thickness (Average Film Thickness) of Uppermost Resin Layer (a1)]

The thickness of the resin layer (A) excluding the thickness of the uppermost resin layer (a1) is set to be 5 µm or more and 20 µm or less. In the case where the lower resin layer of the resin layer (A) excluding the uppermost resin layer (a1) is defined as a2 and where the thickness of a2 is less than 5 µm, it is not possible to achieve sufficient resin strength for the resin layer (a2) to achieve interface adhesiveness to the resin layer (a1) while achieving adhesiveness to the metal sheet. On the other hand, in the case where the thickness is more than 20 µm, it is not possible to expect a further increase in properties required for materials for beverage cans or materials for food cans corresponding to an increase in thickness, and there is only an increase in resin costs. Therefore, the thickness of the resin layer (A) excluding the thickness of the uppermost resin layer (a1), that is, the thickness of the resin layer (a2) is set to be 5 µm or more and 20 µm or less.

[Chemical Composition of a Resin Layer (b), which is to be on the Outer-Surface Side of a Container]

It is preferable that the metal sheet have a resin layer (B) having a multi-layer structure containing polyester as a main component on the outer-surface side of the container when the metal sheet is formed into the container, in which a resin layer (b1) which comes into contact with the metal sheet contains components described in (I) through (V) below.

(I) A polyester resin (II) A phenol resin (III) A metal alkoxide-based compound and/or metal chelate compound (IV) An epoxy resin (V) At least One selected from the group consisting of a polyamine resin, a polyamide amine resin, and a polyamide resin The resin layer (B) contains a polyester resin as a main component, where "main component" refers to a case where the resin coating layer (B) contains a polyester resin in an amount of 50 mass % or more among resin components.

Hereafter, the components of the resin layer (b1) will be described.

(I) Polyester resin

It is preferable that the polyester resin have a number average molecular weight of 3000 or more and 100000 or less, more preferably 5000 or more and 30000 or less, or even more preferably 10000 or more and 25000 or less. Here, "number average molecular weight" refers to a corresponding value derived in comparison with polystyrene in gel permeation chromatography. There is a decrease in formability in the case where the number average molecular weight is lower than 3000, and there is a case where it is not always possible to perform appropriate coating due to an increase in viscosity when coating is performed in the case where the number average molecular weight is higher than 100000.

It is preferable that the glass-transition temperature of a polyester resin be 0° C. or higher and lower than 100° C. By controlling the glass-transition temperature to be 0° C. or higher and lower than 100° C., since the flexibility, formability, and blocking resistance of the resin are appropriately balanced, the metal sheet can preferably be used for food cans.

There is a case where it is difficult to satisfy many required properties only by using one kind of polyester resin. In the case where a single polyester resin is used, for example, in the case where the glass-transition temperature of the polyester resin is 0° C. or higher and lower than 35° C., since the resin layer is provided with flexibility, excellent formability is achieved. However, in the case where a film is coated with the resin layer and the coated film is held in a coiled state at a temperature higher than the glass-transition temperature for a long time, there is concern that blocking of the film occurs. In addition, since heat resistance is insufficient due to the low glass-transition temperature, retort resistance is comparatively poor. In the case where the glass-transition temperature is 35° C. or higher and lower than 65° C., since the blocking of a film does not occur, there is no decrease in aesthetic appearance quality of a film. In the case where the glass-transition temperature is 65° C. or higher and lower than 100° C., although blocking resistance is excellent, formability is comparatively poor due to an increase in the hardness of the film. Therefore, it is preferable to obtain a well-balanced and more excellent resin layer by using plural kinds of polyester resins having different glass-transition temperatures in combination in order to utilize the good properties of the respective polyester resins.

In addition, in the case where plural resins having different glass-transition temperatures are used in combination, it is preferable that the content of each of the polyester resins be as follows.

Polyester resin having a glass-transition temperature of 0° C. or higher and lower than 35° C.: 30 mass % or more and 80 mass % or less Polyester resin having a glass-transition temperature of 35° C. or higher and lower than 65° C.: 10 mass % or more and 35 mass % or less Polyester resin having a glass-transition temperature of 65° C. or higher and lower than 100° C.: 10 mass % or more and 35 mass % or less By controlling the contents to be within these ranges, there is a significant increase in the balance between formability and blocking resistance.

In addition, it is preferable that the polyester resin contain a repeating unit derived from diphenolic acid. In the case where diphenolic acid is added to a monomer composition, which is a raw material component for manufacturing a polyester resin, there is an increase in reactivity with a phenol resin and in hardening rate, which results in an increase in retort-blushing resistance. Also, by using a polyester which is manufactured by using diphenolic acid as an essential monomer and which has a glass-transition temperature of 0° C. or higher and lower than 35° C. in a large amount, there is an increase in hardenability. As described above, it is preferable that the polyester resin contain a repeating unit derived from diphenolic acid, because it is possible to achieve, for example, excellent blocking properties for a coating film despite a low glass-transition temperature.

Examples of a polyester resin (I) which may be used include one derived by an esterification reaction between polybasic acid components and polyhydric alcohol components. Examples of polybasic acid components to be used include one or more of dibasic acids such as phthalic anhydride, isophthalic acid, terephthalic acid, succinic acid, fumaric acid, adipic acid, azelaic acid, sebacic acid, and dimer acid and lower alkyl esterified compounds derived from these acids, and, for example, monobasic acids such as benzoic acid and crotonic acid and polybasic acids having a valence of three or more such as trimellitic anhydride and methylcyclohexenetricarboxylic acid are also used in combination as needed.

Examples of polyhydric alcohol components to be mainly used include dihydric alcohols such as ethylene glycol, diethylene glycol, propylene glycol, 1,4-butanediol, neopentyl glycol, 3-methylpentanediol, 1,4-hexanediol, 1,6-hexanediol, and cyclohexanedimethanol, and polyhydric alcohols having a valence of three or more such as glycerin, trimethylolethane, trimethylolpropane, and pentaerythritol may also be used in combination as needed. These polyhydric alcohols may be used separately, or the mixture of two or more of these polyhydric alcohols may be used.

Examples of commercially available polyester resins (I) include VYLON 300, 500, 560, 600, 630, 650, and 670, and VYLON GK 130, 140, 150, 190, 330, 590, 680, 780, 810, and 890 produced by TOYOBO Co., Ltd., elitel UE-3220, 3500, 3210, 3215, 3216, 3620, 3240, 3250, and 3300 produced by UNITIKA Ltd., and Aron Melt PES-310, 318, and 334 produced by TOAGOSEI Co., Ltd.

(II) Phenol Resin

It is preferable that a phenol resin be further added to the resin layer (b1) as a component (II). Since a three-dimensional network is formed as a result of a cross-linking reaction occurring due to the addition of a phenol resin, it is possible to realize the effect of increasing the corrosion resistance and retort resistance of a coating film. The examples of the phenol resins include one derived by combining trifunctional phenol compounds such as carbolic acid, m-cresol, m-ethylphenol, 3, 5-xylenol, and m-methoxyphenol, or various bifunctional phenols such as p-cresol, o-cresol, p-tert-butylphenol, p-ethylphenol, 2, 3-xylenol, 2, 5-xylenol, and m-methoxyphenol with formaldehyde in the presence of an alkali catalyst. These phenol compounds may be used separately, or the mixture of two or more of these phenol compounds may be used. In addition, a compound derived by etherifying the whole or a part of the methylol groups contained in a phenol resin with alcohol having a carbon number of 1 to 12 may be used.

(III) Metal Alkoxide-Based Compound and/or Metal Chelate Compound

A metal alkoxide-based compound and/or a metal chelate compound react with (I) a polyester resin, (II) a phenol resin, and (IV) an epoxy resin. A cross-linking reaction progresses among the functional groups of each of the resins and a metal alkoxide-based compound and/or a metal chelate compound. In the case of such a cross-linking reaction, the hardening rate of a film is much larger than in the case where a metal alkoxide-based compound and/or a metal chelate compound does not exist, which makes it possible to achieve excellent adhesiveness, formability, retort resistance, and corrosion resistance with a very small thermal energy. For example, in the case of a conventional laminated can, after a laminated film has been formed, baking is performed at a temperature of 180° C. or higher for several seconds to several minutes, then the resin film is hardened by utilizing subsequent post-heating in order to achieve the various required properties described above. However, in the case of a resin layer containing a metal alkoxide-based compound and/or a metal chelate compound according to the present invention, the resin layer is sufficiently hardened only by performing short-time heating for about one second in a thermal fusion-bonding lamination process, and it is possible to achieve the properties equal to or higher than those of a resin film which has been subjected to post-heating. Therefore, since post-heating in the manufacturing process is not necessary, there is a significant increase in productivity. In addition, since it is possible to realize the reduction of $CO_2$ emission, this technique is expected to have a marked effect on the industry. Moreover, since metal is contained in the film, there is an increase in the strength of the film, which results in a significant increase in impact resistance and corrosion resistance. For the reasons described above, it is preferable that the resin layer (b1) contain a metal alkoxide-based compound and/or a metal chelate compound.

Examples of a metal alkoxide-based compound and/or a metal chelate compound include alkoxide metal compounds containing, for example, aluminum, titanium, tin, and zirconium, and metal chelate compounds derived by the coordinate bond of acetoacetic acid with a metal. In particular, it is preferable to use a titanium alkoxide-based compound and/or a titanium chelate compound. Hereafter, the reasons for this will be described.

By a continuous cross-linking reaction between a metal alkoxide-based compound and/or a metal chelate compound and a polyester resin and/or a phenol resin, a three-dimensional network of molecular chains is formed in a resin layer. As a result, it is possible to most effectively inhibit color change due to the penetration of water vapor or hot water in a retort treatment environment. "Color change due to water vapor" refers to a phenomenon in which a resin layer becomes white and cloudy in a retort sterilization treatment process and which is called "retort-blushing". Since such a phenomenon decreases the design property of the outer surface of a can, there is a large problem of a decrease in consumers' buying motivation. From the results of diligent investigations conducted by the present inventors, this is considered to be because, since liquid foams are formed at the interface between resin layers and in the vicinity of the interface as a result of water vapor penetrating into the resin layer with which is a can body is coated, light is scattered in the portion in which liquid foams are formed. Therefore, in order to improve the property, it is important to inhibit the formation of liquid foams at the interface between resin layers and in the vicinity of the interface. That is, water vapor which has penetrated into the resin layer reaches the interface between the resin layer and the metal sheet by diffusing through the resin layer. Since contents filled in the can has a temperature near room temperature immediately after a retort treatment has been started, there is a temperature gradient from the outer surface to the inner surface of the can. That is, since water vapor diffusing through the resin layer is cooled as the water vapor approaches the metal sheet, the water vapor liquefies at the interface between the resin layer and the metal sheet and in the vicinity of the interface, and then the condensed water forms liquid foams. Since the liquid foams are retained at the interface and in the vicinity of the interface after a retort treatment has been performed, the surface of the resin layer appears white and cloudy due to the scattering of light. Therefore, in order to inhibit retort-blushing, it is appropriate to inhibit the formation of liquid foams at the interface between the metal sheet and the resin layer and in the vicinity of the interface.

On the other hand, examples of a retort treatment apparatus include one using hot water as a heating medium in addition to one using water vapor as a heating medium as described above. In the case of a retort treatment apparatus using hot water as a heating medium, there is a problem of a decrease in design property due to the color change of a resin layer occurring by a mechanism different from that by which the color change is caused by water vapor occurs. It is considered that, in the case where the cross-linking reaction of polyester molecular chains does not sufficiently progress in the early stage of a retort treatment, since water which has penetrated into a resin layer promotes the hydrolysis reaction of polyester molecular chains in the presence of the carbonyl end group of polyester acting as a catalyst, large liquid foams are formed in the resin layer.

From the results of investigations diligently conducted by the present inventors regarding the two kinds of color change phenomena described above, it was found that, in the case where a titanium alkoxide-based compound and/or a titanium chelate-based compound are used as a metal alkoxide-based compound and/or a metal chelate compound, it is possible to sufficiently form the network of polyester molecular chains formed by a cross-linking reaction among a titanium alkoxide-based compound and/or a titanium chelate-based compound and a polyester resin and/or a phenol resin in a thermal fusion-bonding lamination process, which makes it possible to most effectively inhibit both kinds of color change phenomena. It is considered that the network of polyester molecular chains inhibits water vapor and hot water from penetrating into the resin layer or reaching the interface and increases the strength and elastic modulus of the resin layer, which makes it possible to inhibit the formation and growth of liquid foams. In addition, since there is a decrease in the amount of carbonyl end groups due to the formation of a molecular-chain network, a rapid hydrolysis reaction is also inhibited. Therefore, it is preferable to use a titanium alkoxide-based compound and/or a titanium chelate compound as a metal alkoxide-based compound and/or a metal chelate compound.

(IV) Epoxy Resin

An epoxy resin mainly increases the adhesiveness of a coating film. In particular, it is preferable to use a novolac-type epoxy resin. Examples of commercially available novolac-type epoxy resins include EPICLON N-665, 670, 673, 680, 690, 695, 730, 740, 770, 865, and 870 produced by DIC Corporation, XD-7855 produced by The Dow Chemical Company, and ECN-1273 and 1299 produced by Asahi Kasei Epoxy Co., Ltd. Examples of biphenyl-type epoxy resins include YL6121H and YX7399 produced by Mitsubishi Chemical Corporation. In addition, it is preferable to use epoxy resins other than bisphenol A. This is because there is concern that bisphenol A may have an endocrine-disrupting effect.

(V) At least One selected from the group consisting of a polyamine resin, a polyamide amine resin, and a polyamide resin A polyamine resin, a polyamide amine resin, and a polyamide resin are superior to, for example, a melamine resin in that such resins have a higher hardening rate and form a stronger coating film than a melamine resin does. Since such resins are superior to, for example, polyester/melamine-based and epoxy/melamine-based resin compositions in terms of hardenability, it is possible to achieve excellent properties, in particular, from the viewpoint of the retort resistance, corrosion resistance, and formability of a laminated steel sheet.

Examples of representative polyamine resins include aliphatic amines such as diethylenetriamine, triethylene triamine, and triethylene pentamine and alicyclic polyamines such as isophoronediamine. In addition, in order to increase operability, to decrease stimulation, and to improve mechanical properties, one derived by adding epoxy resins or acrylonitrile to an aliphatic polyamine and one derived by reacting formaldehyde and phenol are also included. Examples of aromatic polyamines include metaphenylene diamine, diaminodiphenylsulfonic acid, and diaminodiphenylmethane. Examples of commercially available polyamine resins include EPICRON EXB-353 produced by DIC Corporation and Ancamine 2596 and Ancamine 2605 produced by Air Products Japan Inc.

A polyamide amine resin and a polyamide resin are compounds which are synthesized, for example, by a dehydration condensation reaction between an oil and fatty acid and a polyamine. Examples of commercially available polyamide amine resins and polyamide resins include POLYMIDE L-15-3 and POLYMIDE L-45-3 produced by Sanyo Chemical Industries, Ltd. and Ancamide 2137, Sunmide 330, and Sunmide X-2000 produced by Air Products Japan Inc.

[Contents of Components of Resin Layer (b1)]

It is preferable that the contents of the resin components of the resin layer (b1) satisfy the conditions below.

(I) Polyester resin: 50 mass % or more and 89 mass % or less (II) Phenol resin: 10 mass % or more and 45 mass % or less (III) Metal alkoxide-based compound and/or metal chelate compound: 0.01 mass % or more and 10 mass % or less (IV) Epoxy resin: 0.5 mass % or more and 20 mass % or less (V) At least one selected from the group consisting of a polyamine resin, a polyamide amine resin, and a polyamide resin: 0.1 mass % or more and 10 mass % or less (I) There is a decrease in formability in the case where the content of a polyester resin is less than 50 mass %, and there may be a decrease in retort resistance due to insufficient hardenability in the case where the content is more than 89 mass %. It is more preferable that the content be 55 mass % or more and 85 mass % or less.

(II) There is a decrease in retort resistance due to insufficient hardenability in the case where the content of a phenol resin is less than 10 mass %, and there may be a decrease in workability in the case where the content is more than 45 mass %. It is more preferable that the content be 20 mass % or more and 40 mass % or less.

(III) There is a case where it is not possible to realize the expected effect of, for example, increasing hardening rate in the case where the content of a metal alkoxide-based compound and/or a metal chelate compound is less than 0.01 mass %. In the case where the content is more than 10 mass %, there is a decrease in formability due to an increase in the hardness of the resin film, and there is a case where gelation may occur when a coating solution is manufactured. It is more preferable that the content be 0.10 mass % or more and 7 mass % or less.

(IV) There is a decrease in corrosion resistance due to a decrease in adhesiveness in the case where the content of an epoxy resin is less than 0.5 mass %, and there may be a decrease in retort-blushing resistance in the case where the content is more than 20 mass %. It is more preferable that the content be 2 mass % or more and 7 mass % or less.

(V) There is a decrease in retort resistance due to insufficient hardenability in the case where the content of one or more selected from the group consisting of a polyamine resin, a polyamide amine resin, and a polyamide resin is less than 0.1 mass %, and there may be a decrease in formability in the case where the content is more than 10 mass %. It is more preferable that the content be 1 mass % or more and 4 mass % or less.

[Thickness (Average Film Thickness) of Resin Layer (b1)]

It is preferable to set the thickness (average film thickness) of the resin layer (b1) to be 0.1 μm or more and 5.0 μm or less. In the case where the thickness is less than 0.1 μm, there is a case where the thickness is not uniform because it is not possible to uniformly coat the surface of the metal sheet. On the other hand, in the case where the thickness is more than 5.0 μm, there is a risk of a decrease in the strength of the resin layer due to insufficient cohesion force of the resin. As a result, since a film is peeled due to cohesion failure in the resin layer in a can manufacturing process, fracturing occurs in a can body starting from the cohesion failure.

As described above, it is preferable that the film thickness (average film thickness) be 0.1 μm or more and 5.0 μm or less, more preferably 0.1 μm or more and 3.0 μm or less, or even more preferably 0.5 μm or more and 2.5 μm or less. Here, although it is possible to convert the film thickness to the coating weight of the resin layer (b1) by using the specific weight of the film composition, it is acceptable that the conversion be performed under the assumption that the specific weight is substantially 1 in the case of the chemical composition according to the present invention.

[Coloring Agent of Resin Layer (b1)]

By adding a coloring agent such as a dye or a pigment to the resin layer (b1), it is possible to hide the base metal sheet and to provide diversified color tones unique to a resin. For example, by adding carbon black as a black pigment, it is possible to hide the metallic color of the base sheet and to lend a food can a premium feel of the color black.

Carbon black having a particle diameter of 5 nm to 50 nm may be used. In particular, in consideration of dispersing capability and color developing capability in a polyester resin, it is preferable that the particle diameter be 5 nm to 30 nm.

By adding a white pigment instead of a black pigment, since it is possible to hide the metallic luster of the base sheet and to provide sharpness to a printed surface, it is possible to achieve good surface appearance. Since a pigment to be added is required to realize excellent design property after container forming has been performed, an inorganic pigment such as titanium dioxide may be used from such a viewpoint. It is preferable to use such a pigment, because, since such a pigment has a strong coloring power and is rich in spreadability, it is possible to realize good design property even after container forming has been performed.

In the case where it is desired to provide a bright color to the surface of a container, it is preferable to use a yellow organic pigment. Since such a pigment has excellent transparency and a strong coloring power and is rich in spreadability, it is possible to achieve surface appearance having a bright color even after container forming has been performed. Examples of organic pigments which may be used in the present invention include, in terms of color index (abbreviated as C.I.), pigment yellow 12, 13, 14, 16, 17, 55, 81, 83, 139, 180, 181, 183, 191, and 214. In particular, from the viewpoint of the sharpness of tone (bright color) and resistance to color change due to hot water, C.I. yellow pigment 180 and 214 are more preferably used. In addition, examples of red pigments include C.I. pigment red 101, 177, 179, 187, 220, and 254, examples of blue pigments include C.I. pigment blue 15, 15:1, 15:2, and 15:3, examples of violet pigments include C.I. pigment violet 19, examples of orange pigments include C.I. pigment orange 64, and examples of green pigments include C.I. green pigment 7. It is preferable that the content of above-mentioned coloring agents be 0.1 PHR to 70 PHR with respect to the amount of the resins in the resin layer (b1).

[Curing Catalyst of Resin Layer (b1)]

In addition to the components (I) through (V) and the coloring agents described above, a curing catalyst, which promotes a cross-linking reaction, may be added to the resin layer (b1). For example, an inorganic acid such as phosphoric acid, an organic acid such as dodecylbenzenesulfonic acid or toluenesulfonic acid, or compounds derived by blocking such acids with, for example, an amine may be used. It is preferable that the content of a curing catalyst be 0.01 PHR to 5 PHR with respect to the amount of resins in the resin layer (b1).

In addition, known lubricants, defoaming agents, leveling agents, pigments, and anti-blocking agents such as silica may be added to the resin layer (b1). In addition, other curing agents such as a melamine resin, a benzoguanamine resin, and an isocyanate resin may be used in combination as curing assistants, and these may appropriately be used in combination in accordance with the drying conditions and laminating conditions of the film.

Hereafter, the resin layer (b2), which is formed on the resin layer (b1), will be described. It is preferable that resin layer (b2) containing a polyester resin as a main component be formed on the resin layer (b1) as the uppermost layer of the resin coating layer (B), or it is more preferable that a polyester film (b2) be formed as the resin layer (b2). By forming a polyester film (b2) as the resin layer (b2) on the resin layer (b1), it is possible to increase formability and corrosion resistance.

[Polyester Film (b2)]

It is preferable that a resin of the polyester film (b2) be a polyester composition derived by mixing a polyethylene terephthalate or copolymerized polyethylene terephthalate containing less than 6 mol % of copolymerization components (hereinafter, also referred to as polyester (i)) and polybutylene terephthalate (hereinafter, also referred to as polyester (ii)), in which the content of the polyester (i) is 60 mass % or less and the content of the polyester (ii) is 40 mass % or more. By preparing such a resin composition, it is possible to stably inhibit resin color change due to the condensation of water vapor in the resin layer while maintaining satisfactory adhesiveness to the metal sheet in a retort sterilization treatment process, which is indispensable in the case of use for a food can.

In the case where the content of the polyester (ii) is less than 40 mass %, since it is not possible to inhibit the condensation of water vapor in a retort sterilization treatment process, there is a case where liquid foams are formed in the resin layer. As a result of such foams being retained in the resin layer after a retort sterilization treatment has been performed, since the scattering of visible light occurs, there may be a decrease in design property due to a change in the surface appearance of the resin. On the other hand, in the case where the content of the polyester (i) is more than 60 mass %, although it is possible to inhibit the above-mentioned change in resin color in the retort sterilization treatment process, since there is a tendency for the heat resistance and mechanical properties of the resin to deteriorate, there is concern that flaws may occur in the resin due to, for example, stress and frictional heat in a can making process. In addition, since the Tg of the polyester (i) is about 40° C. and lower than that of the polyester (ii), there may be a significant decrease in corrosion resistance due to a significant decrease in the barrier capability of the resin in the case where the resin is exposed to a temperature higher than room temperature. Therefore, it is preferable that the content of the polyester (i) be 40 mass % or more and 60 mass % or less, more preferably 45 mass % or more and 58 mass % or less, or even more preferably 50 mass % or more and 56 mass % or less. Here, the polyester (i) may contain copolymerization components within a range of less than 6 mol % in which the effects of the present invention are not decreased. Examples of copolymerization components include acid components and alcohol components. Examples of acid components include aromatic dicarboxylic acid such as isophthalic acid, phthalic acid, and naphthalene dicarboxylic acid, aliphatic dicarboxylic acid such as adipic acid, azelaic acid, sebacic acid, and decanedicarboxylic acid, and alicyclic dicarboxylic acid such as cyclohexanedicarboxylic acid. Among such components, it is most preferable to use isophthalic acid from the viewpoint of formability. In addition, examples of alcohol components include aliphatic diol such as diethylene glycol, propanediol, butanediol, and hexanediol and alicyclic diol such as cyclohexanedimethanol.

The polyester (ii) is derived mainly from terephthalic acid components and 1, 4-butanediol components through polycondensation and may contain other copolymerization components within a range of less than 5 mol % in which the effects of the present invention are not decreased. Acid components or alcohol components may be used as such copolymerization components. Examples of acid copolymerization components include aromatic dicarboxylic acid such as isophthalic acid, phthalic acid, and naphthalene dicarboxylic acid, aliphatic dicarboxylic acid such as adipic acid, azelaic acid, sebacic acid, and decanedicarboxylic acid, and alicyclic dicarboxylic acid such as cyclohexanedicarboxylic acid. Among such components, it is preferable to use isophthalic acid, 2, 6-naphthalene dicarboxylic acid, or adipic acid. Examples of alcohol copolymerization components include aliphatic diol such as ethylene glycol, propanediol, and hexanediol and alicyclic diol such as cyclohexanedimethanol. One, two, or more of these components may be used.

[Wax Compound]

Moreover, in the present invention, it is preferable that the resin layer (B) contain wax compounds in an amount of 5.0 mass % or less with respect to the resin layer (B) in order to prevent scratching and shaving from occurring in the resin layer (B) when intense work is performed. It is not preferable in a printing application that the content is more than 5.0 mass %, because there is a decrease in adhesiveness between the resin layer (B) and an ink when a container surface is printed or typed. Also, it is not preferable that the content be more than 5.0 mass %, because the formation of the resin layer (B) is difficult. On the other hand, in the case where the content of wax compounds is less than 0.02 mass %, there is a case where it is not possible to realize the effect of preventing scratching and shaving from occurring in the resin layer (B) due to the addition of wax compounds. Therefore, in the case where wax compounds are added, it is preferable that the content be 0.02 mass % or more.

Wax compounds may be added to both or one of the uppermost resin layer (b2) and the resin layer (b1) excluding the uppermost layer. In particular, it is preferable to add wax compounds to the uppermost resin layer (b2) from the viewpoint of preventing scratching and shaving from occurring in the resin layer (B) when intense work is performed and achieving satisfactory formability when intense work is performed. In addition, in the case where wax compounds are added only to the uppermost resin layer (b2), the content of wax compounds added in order to realize the same level of effect is smaller than in the case where wax compounds are added to the whole of the resin layer (B).

In the case where wax compounds are added to the uppermost resin layer (b2), it is preferable that the content of the wax compounds in the uppermost resin layer (b2) be 5.0 mass % or less with respect to the resin layer (B) (in terms of content with respect to the whole resin layer) and be 5.0 mass % or less with respect to the uppermost resin layer (b2). Ii is not preferable in a printing application that the content be more than 5.0 mass %, because there is a decrease in adhesiveness between the resin layer (B) and an ink when a container surface is printed or typed. Also, it is not preferable that the content be more than 5.0 mass %, because the formation of the resin layer (B) is difficult. On the other hand it is preferable that the lower limit of the content of wax compounds in the uppermost resin layer (b2) be 0.02 mass % with respect to the resin layer (B) (in terms of content with respect to the whole resin layer) in order to realize the effect due to the addition of wax compounds.

That is, it is preferable that the upper limit of any one of the contents of wax compounds in the whole resin layer (B), in the uppermost resin layer (b2), and in the resin layer (b1) excluding the uppermost layer be 5.0 mass %.

Here, in the case where wax compounds are added to the uppermost resin layer (b2) and the resin layer (b1) excluding the uppermost layer, it is possible to derive the content of wax compounds in terms of content with respect to the whole resin layer (B) by dividing the mass of the wax compounds added to the uppermost resin layer (b2) and the resin layer (b1) excluding the uppermost layer by the mass of the whole resin layer (B).

There is no particular limitation on the kinds of wax compounds. Both an organic lubricant and an inorganic lubricant may be used. The same wax components as those used for the resin layer (A) may be used. However, since there is a tendency for the temperature of the resin layer to be higher on the outer-surface side of a container than on the inner-surface side of a container due to friction with a mold in a can making process, it is preferable to use wax compounds having a high melting point. It is preferable that the melting point of the wax compounds be 50° C. or higher, or more preferably 70° C. or higher. Examples of preferable wax compounds include natural waxes such as carnauba wax and candelilla wax, fatty acid esters such as stearic acid ester, and polyolefin waxes such as polyethylene wax. These wax compounds may be used separately, or the mixture of two or more of these wax compounds may be used.

[Manufacturing Method]

Hereafter, embodiments of the method for manufacturing the resin-coated metal sheet for a container according to the present invention will be described.

First, a method for manufacturing the resin layers (A) and (B) (including films) having a multi-layer structure with which is a metal sheet is coated will be described.

There is no particular limitation on what method is used for manufacturing resin layers (A) and (B). For example, by drying polyester resins or the like as needed, by feeding film components into a known melt lamination extruder, by extruding the components through a slit-like die into a sheet-like shape, by pressing the extruded sheet close to a casting drum by using, for example, an electrostatic adhesion method in order to cool and solidify the sheet, a non-elongated film (sheet) is obtained. In order to obtain a multi-layer film, by feeding the target film components into a lamination extruder, a non-elongated film having a multi-layer structure is obtained. By elongating such a non-elongated film in the longitudinal and width directions, a biaxially elongated film is obtained. Elongation ratio may be randomly set in accordance with, for example, the degree of orientation, strength, and elastic modulus of the target film. It is preferable to use a tenter method from the viewpoint of a film quality. It is preferable to use a stepwise biaxial elongation method, in which a film is elongated in the longitudinal direction and then elongated in the width direction, or a simultaneous biaxial elongation method, in which a film is elongated in the longitudinal and width directions almost at the same time.

Method for Forming a Multi-Layer Structure of a Resin Layer

There is no particular limitation on what method is used for forming a multi-layer structure (having two layers or more) of a resin layer, and an example of a method, in which a resin layer (b1) is formed on the surface of a polyester film (b2), will be described. By dissolving a polyester resin, which is a main component, in an organic solvent, and by dissolving or dispersing additive components of a resin layer (b1) according to the present invention and optional additive components in the organic solvent, a coating solution is prepared. By applying this coating solution to the surface of a polyester film (b2) in or after the film-forming process, and by drying the applied solution, a resin layer (b1) is formed.

Examples of organic solvents in which the polyester resin is dissolved include aromatic hydrocarbon solvents such as toluene and xylene, ketonic solvents such as methyl ethyl ketone and cyclohexanone, and ester-based solvents such as ethyl acetate and ethylene glycol monoethyl ether acetate, and one or more of these solvents may appropriately be selected and used.

The above-described coating solution may contain known lubricants, defoaming agents, leveling agents, pigments, and anti-blocking agents such as silica. In addition, other curing agents such as melamine resin, benzoguanamine resin, and isocyanate resin may be used in combination as a curing assistant, and these curing assistants may be appropriately used in combination in accordance with the drying conditions and laminating conditions of the film.

In addition, additive agents such as carbon black and azo-based pigments may be used by dispersing these additive agents in the organic solvent as cross-linking agents, curing catalysts, and coloring agents according to the present invention. At this time, it is preferable to use a dispersant in combination, because the uniformity of the additive agents is provided.

Examples of methods for applying a coating solution to a polyester film include conventionally known coating methods such as a roll coater method, a die coater method, a gravure method, a gravure offset method, and a spray painting method. It is most preferable to use a gravure roll coating method. It is preferable to perform drying after the coating solution has been applied at a temperature of 80° C. to 180° C. for 1 second to 30 seconds, in particular, at a temperature of 150° C. to 170° C. for 5 seconds to 30 seconds. It is preferable that the thickness of the resin layer (b1) dried be 0.1 µm or more and 5.0 µm or less. In the case where the thickness is 0.1 µm or more and 5.0 µm or less, it is possible to achieve excellent continuously and uniformly painting capability without causing any problem in design property, satisfactory retort resistance, and satisfactory adhesiveness, and a blocking problem in a film coiling process is eliminated. In the case where the thickness is less than 0.1 µm, since a problem in film continuity tends to occur, there is a case where it is difficult to achieve the desired properties and design property. In addition, since there is a decrease in barrier capability against water vapor in a retort sterilization treatment process, water tends to be retained at the resin layer (b1)/polyester film (b2) interface, which may cause retort-blushing. On the other hand, in the case where the thickness is more than 5.0 µm, since there is a decrease in solvent separation capability after a coating process, there is a significant decrease in operability, and there may be a significant decrease in blocking resistance in a film coiling process due to a tendency of a problem regarding a retained solvent to occur. It is more preferable that the thickness be 0.5 µm or more and 2.5 µm or less.

Hereafter, a method for manufacturing a resin-coated metal sheet by forming a laminated resin layer (film) on a metal sheet will be described.

In the present invention, for example, a method (hereinafter, referred to as lamination), in which, by heating the metal sheet to a temperature higher than the melting point of the film, by compressing the resin films onto both surfaces of the metal sheet by using pressure bonding rolls (hereinafter, referred to as laminating rolls) in order to bond the films and the metal sheet through thermal fusion bonding, may be used. At this time, in the case of the film, which is to be on the inner-surface side of a container after container forming has been performed, the surface on the side of the resin layer (a2), to which wax compounds is not added, is brought into contact with the metal sheet and bonded through thermal fusion bonding.

Lamination conditions are appropriately set so that the resin layers according to the present invention are formed. First, for example, it is necessary that the surface temperature of the metal sheet when lamination is started be equal to or higher than the Tm (melting point)(° C.) of a resin layer which is to be brought into contact with the metal sheet. Specifically, it is necessary to control the surface temperature to be equal to or higher than the Tm of the resin layer and equal to or lower than the Tm+40° C. By controlling the surface temperature of the metal sheet to be equal to or higher than the Tm of the resin layer, since the resin layer is melted so that the surface of the metal sheet is wet with the melted resin layer, it is possible to achieve good adhesiveness between the resin layer and the metal sheet. On the other hand, in the case where the surface temperature is higher than the Tm+40° C., since the resin layer is melted to an excessive degree, there is concern that the resin layer may adhere to the laminating rolls, and it is difficult to control the crystal structure of the resin layer (a1), which is a surface layer, to be within the range according to the present invention. It is preferable that the surface temperature be equal to or higher than the Tm and equal to or lower than the Tm+25° C., or more preferably equal to or higher than the Tm and equal to or lower than the Tm+15° C.

Since, in embodiments of the present invention, it may be necessary to control the crystal structure of the resin layer (a1), which is the uppermost layer of the resin layer (A), to be in an appropriate state, it may be necessary to control the surface temperature of the laminating rolls. Specifically, it is necessary to control the surface temperature of the laminating rolls to be equal to or higher than the Tg of the resin layer (a1) and equal to or lower than the Tg+60° C. It is needless to say that control of a contact time with the laminating rolls is also an important factor. It is necessary to control the contact time to be 10 msec or more and 15 msec or less. By controlling the surface temperature of the laminating rolls and the contact time to be within the ranges described above, it is possible to achieve the crystal structure of the resin layer (a1) according to the present invention.

Moreover, it is preferable that the resin layers (A) and (B) be heated before lamination is performed. By softening the resin layers in advance, it is possible to achieve a higher level of uniformity in the temperature distribution in the cross sections of the resin layers when lamination is performed. It is known that, with this method, since there is a decrease in the degree of change in the crystal structures in the cross sections of the resin layers from the interfaces with the metal sheet to the surface layers, it is possible to achieve a higher level of uniformity in the properties. Specifically, it is preferable to control the temperature of the resin layers (A) and (B) before lamination is performed to be equal to or higher than the Tg+30° C. and equal to or lower than the Tg+100° C.

It is necessary to perform quenching immediately after lamination has been performed in order to fix the crystal structures of the resin layers. It is preferable that the time until quenching is started be 5 seconds or less, and it is necessary that the temperature of water for quenching be equal to or lower than the Tg.

Here, in the present invention, it is preferable to form the resin layer into a film before coating the metal sheet with the resin layer. In the case of a melt extrusion lamination method, in which the resin layer is melted without forming a film and applied to the surface of the metal sheet, there is a case where it is not possible to achieve the crystal structure according to the present invention.

Example 1

Hereafter, the examples of the present invention will be described.

(Method for Manufacturing a Metal Sheet)

By performing chromium plating following degreasing and pickling on a steel sheet having a thickness of 0.18 mm and a width of 977 mm which had been subjected to cold rolling followed by annealing and temper rolling, a chromium-plated steel sheet (TFS) was manufactured. Chromium plating process included a chromium plating treatment in a chromium plating bath containing $CrO_3$, $F^-$, and $SO_4^{2-}$, an intermediate rinsing treatment, and an electrolytic treatment in a chemical conversion solution containing $CrO_3$, $F^-$. At that time, the electrolytic conditions (current density, electric quantity, and so forth) were controlled so that the coating weights of metal chromium and chromium hydroxide were respectively 120 $mg/m^2$ and 15 $mg/m^2$ in terms of Cr.

(Method for Manufacturing a Film for a Resin Coating Layer on the Inner-Surface Side of a Container)

The acid components and the glycol components given in Table 1 were made into polyester resins, by polymerizing all the acid copolymerization components other than terephthalic acid with ethylene glycol in order to obtain polyethylene terephthalate or copolymerized polyethylene terephthalate, and by further mixing polybutylene terephthalate derived by polymerizing terephthalic acid and butylene glycol into the compounds. By mixing the wax compounds into these polyester resins in order to obtain resin compositions, by drying, melting, and extruding the resin compositions by using ordinary methods, by then cooling and solidifying the resin compositions on a cooling drum in order to obtain non-elongated films, and by then performing biaxial elongation and heat fixation, biaxially elongated polyester films (A) were obtained.

(Method for Manufacturing a Film for a Resin Coating Layer on the Outer-Surface Side of a Container)

The acid components and the glycol components given in Table 2 were made into polyester resins, by polymerizing all the acid copolymerization components other than terephthalic acid with ethylene glycol in order to obtain polyethylene terephthalate or copolymerized polyethylene terephthalate, and by further mixing polybutylene terephthalate derived by polymerizing terephthalic acid and butylene glycol into the compounds. By drying and melting the polyester resins by using ordinary methods, by performing co-extrusion by using a T-die, by then cooling and solidifying the resin compositions on a cooling drum in order to obtain non-elongated films, and by then performing biaxial elongation and heat fixation, biaxially elongated polyester films (b2) were obtained.

Subsequently, by dissolving various polyester resins, phenol resins, metal alkoxide-based compounds and/or metal chelate compounds, epoxy resins, polyamine resins, polyamide amine resins, polyamide resins, and coloring agents given in Tables 3 and 4 in a solvent formed by mixing toluene and methyl ethyl ketone in the amounts given in Tables 3 and 4, coating solutions were prepared.

Here, an example of a method for synthesizing a polyester resin (I-1) containing a repeating unit derived from diphenolic acid will be described. By charging acid components including 50 pts.mass of terephthalic acid, 112 pts.mass of isophthalic acid, and 4.9 pts.mass of diphenolic acid, and polyhydric alcohols including 50 pts.mass of 2-ethyl-2-butyl-1,3-butanediol, 99 pts.mass of 1,4-butanediol, 48 pts.mass of 1,4-cyclohexanedimethanol, and 0.07 pts.mass of titanium tetrabutoxide into a 2 L flask, and by slowly heating the contents of the flask to a temperature of 220° C. over 4 hours in order to distill out water, an esterified compound was obtained. After distilling out a specific amount of water, heating the obtained compound to a temperature of 250° C. while performing reduced-pressure polymerization at a pressure of 10 mmHg over 30 minutes, and by subsequently performing late-stage polymerization at a pressure of 1 mmHg or less over 50 minutes. Subsequently, by stopping reduced-pressure polymerization, by cooling the compound to a temperature of 220° C. in a nitrogen gas stream, by adding 1.9 pts.mass of trimellitic anhydride to the compound, by stirring the compound at a temperature of 220° C. for 30 minutes in order to perform carboxy group modification (post addition), and then by removing a resin, a polyester resin (I-1) having an average molecular weight of 22000, an acid value of 5 (mgKOH/g), and a glass-transition temperature of 30° C. was obtained. After this, by cooling the resin to a temperature of 60° C. or lower, and by diluting the resin in a mixed solution containing 50 mass % of methyl ethyl ketone and 50 mass % of toluene, the solution of the polyester resin (I-1) having a non-volatile content of 40% was obtained.

As a polyester resin (I-2), for example, VYLON GK-250 (having an average molecular weight of 10000 and a glass-transition temperature of 60° C. and produced by TOYOBO Co., Ltd.), which is a commercially available polyester resin, may be used. By diluting VYLON GK-250 in a mixed solution containing 50 mass % of methyl ethyl ketone and 50 mass % of toluene, the solution of the polyester resin (I-2) having a non-volatile content of 40% was obtained.

As a polyester resin (I-3), for example, VYLON GK-640 (having an average molecular weight of 18000 and a glass-transition temperature of 79° C. and produced by TOYOBO Co., Ltd.), which is a commercially available polyester resin, may be used. By diluting VYLON GK-250 in a mixed solution containing 50 mass % of methyl ethyl ketone and 50 mass % of toluene, the solution of the polyester resin (I-3) having a non-volatile content of 40% was obtained.

In addition, as a phenol resin (II), for example, TD2495 (p-cresol-type phenol resin, 50% normal butanol solution, produced by DIC Corporation), which is a commercially available article, was used.

As a metal chelate compound (III), for example, commercially available TC-200 (titanium octylene glycol chelate, produced by Matsumoto Fine Chemical Co., Ltd.) was used, and, as a metal alkoxide compound, commercially available ZA-65 (zirconium butoxide, produced by Matsumoto Fine Chemical Co., Ltd.) was used.

As an epoxy resin (IV), commercially available EPICLON N-660 (cresol novolac-type epoxy resin, 50% methyl ethyl ketone solution, produced by DIC Corporation) and commercially available YL6121H (biphenyl-type epoxy resin, produced by Mitsubishi Chemical Corporation) were used.

In addition, as a polyamine resin (V), commercially available EPICRON EXB-353 (produced by DIC Corporation) was used. As a polyamide amine resin, commercially available SUNMIDE 328A (produced by Air Products Japan Inc.) was used. As a polyamide resin, commercially available POLYMIDE L-15-3 produced by Sanyo Chemical Industries, Ltd. was used.

By applying the coating solution described above to the surface on one side of the biaxially oriented polyester film (b2) obtained as described above by using a gravure roll coater so that a specified dried film thickness was achieved, and by then drying the solution, the thickness of the dried resin layer (b1) was controlled. The drying temperature was 80° C. to 120° C.

(Method for Manufacturing a Resin-Coated Metal Sheet for a Container)

By using a laminating apparatus for a metal sheet illustrated in FIG. 1, the chromium-plated steel sheet 1 obtained as described above was heated with a metal sheet-heating device 2, and then a laminated polyester film (A), which was to be on the inner-surface side of a container after the container had been formed, was formed (thermal fusion bonding) on one side of the chromium-plated steel sheet 1 by using laminating rolls 3 while a laminated polyester film (B), which was to be on the outer side of the container, was formed (thermal fusion bonding) on the other side.

When the laminated polyester film (A) was formed on the metal sheet, the surface temperature of the metal sheet was controlled to be equal to or higher than the Tm of a polyester resin layer (a1) included in the polyester film (A) and equal to or lower than the Tm+40° C. with the exception of some of the comparative examples. In addition, the surface temperature of the laminating rolls 3 was controlled to be equal to or higher than the Tg of the polyester film (A) and equal to or lower than the Tg+60° C., and the contact time with the metal sheet was controlled to be 10 msec to 15 msec. Here, there was little difference among the Tg's of the resins given in Table 1, and the Tg's were about 75° C. The laminating rolls 3 had an internal water-cooled system, and the temperature in a film adhesion process was controlled by circulating cooling water through the roll interior. The temperature of the resin layer before lamination was performed was controlled to be equal to or higher than (the Tg of the polyester film (A))+30° C. and equal to or lower than the Tg+100° C. so that the temperature distribution inside the cross section of the resin layer was uniform. Subsequently, by performing water cooling with a metal sheet-cooling device 5, a resin-coated metal sheet for a container was manufactured. The manufacturing conditions are given in Table 5.

Figure 2:
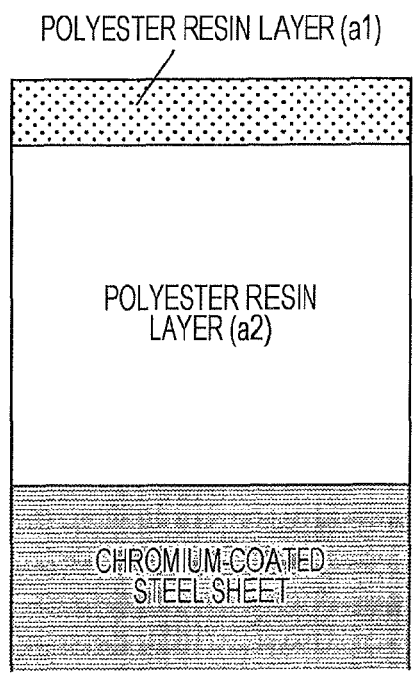
FIG. 2 is a diagram illustrating the cross-sectional structure of a resin-coated metal sheet for a container (Example 1).
Figure 2:
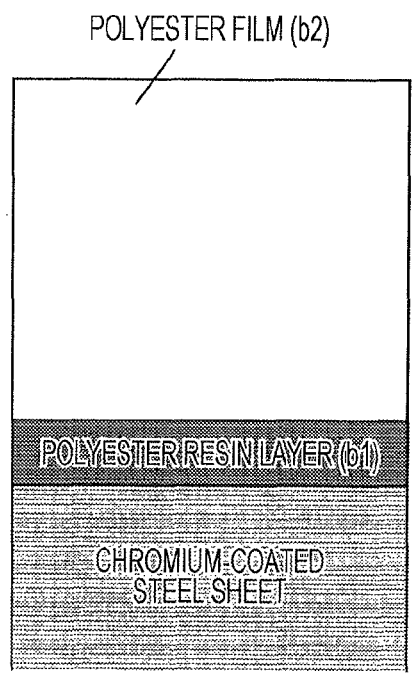

The cross-sectional structures of the resin-coated metal sheet for a container manufactured as described above are illustrated in FIG. 2.

TABLE 1

| | Inner Surface Side of Can: Polyester Film (a1) (Upper Layer) | | | | | | | |
|---|---|---|---|---|---|---|---|---|
| | Kind of Resin | | | Wax Compound | | Raman Band Intensity Ratio ($I_{MD}/I_{ND}$) | | | Melting Point |
| No. | Acid Component | Glycol Component | Kind | Content (mass %) | Maximum Value | Average Value | Thickness (μm) | [° C.] |
| 1 | Terephthalic Acid (100) | Ethylene Glycol (100) | Carnauba Wax | 0.8 | 2.5 | 2.0 | 3.0 | 255 |
| 2 | Terephthalic Acid (100) | Ethylene Glycol (100) | Carnauba Wax | 0.7 | 2.0 | 1.5 | 3.0 | 255 |

TABLE 1-continued

| No. | Acid Component | Glycol Component | Wax | | | | |
|---|---|---|---|---|---|---|---|
| 3 | Terephthalic Acid (100) | Ethylene Glycol (100) | Carnauba Wax | 0.9 | 2.4 | 2.3 | 3.0 | 255 |
| 4 | Terephthalic Acid (100) | Ethylene Glycol (100) | Carnauba Wax | 0.8 | 2.6 | 2.1 | 3.0 | 255 |
| 5 | Terephthalic Acid (100) | Ethylene Glycol (50) Butylene Glycol (50) | Carnauba Wax | 0.8 | 2.7 | 2.3 | 3.0 | 220, 248 |
| 6 | Terephthalic Acid (100) | Ethylene Glycol (100) | Carnauba Wax | 0.7 | 3.1 | 2.6 | 3.0 | 255 |
| 7 | Terephthalic Acid (100) | Ethylene Glycol (100) | Carnauba Wax | 0.8 | 3.6 | 2.8 | 3.0 | 255 |
| 8 | Terephthalic Acid (100) | Ethylene Glycol (100) | Carnauba Wax | 0.8 | 1.5 | 1.0 | 3.0 | 255 |
| 9 | Terephthalic Acid (100) | Ethylene Glycol (100) | Carnauba Wax | 0.8 | 1.3 | 0.9 | 3.0 | 255 |
| 10 | Terephthalic Acid (100) | Ethylene Glycol (100) | Carnauba Wax | 0.2 | 2.5 | 2.0 | 3.0 | 255 |
| 11 | Terephthalic Acid (100) | Ethylene Glycol (100) | Carnauba Wax | 1.8 | 2.5 | 2.0 | 3.0 | 255 |
| 12 | Terephthalic Acid (100) | Ethylene Glycol (100) | Carnauba Wax | 1.2 | 2.0 | 1.5 | 0.7 | 255 |
| 13 | Terephthalic Acid (100) | Ethylene Glycol (100) | Carnauba Wax | 0.7 | 2.5 | 2.0 | 8.0 | 255 |
| 14 | Terephthalic Acid (100) | Ethylene Glycol (100) | Polyethylene Wax | 1.0 | 2.5 | 2.0 | 3.0 | 255 |
| 15 | Terephthalic Acid (100) | Ethylene Glycol (100) | Polyethylene Wax | 1.5 | 2.0 | 1.5 | 3.0 | 255 |
| 16 | Terephthalic Acid (90) Isophthalic Acid (10) | Ethylene Glycol (100) | Carnauba Wax | 0.9 | 2.7 | 2.3 | 3.0 | 230 |
| 17 | Terephthalic Acid (87) Isophthalic Acid (13) | Ethylene Glycol (100) | Carnauba Wax | 0.8 | 2.6 | 2.2 | 3.0 | 224 |
| 18 | Terephthalic Acid (100) | Ethylene Glycol (100) | Carnauba Wax | 0.8 | 2.2 | 1.5 | 3.0 | 255 |
| 19 | Terephthalic Acid (100) | Ethylene Glycol (60) Butylene Glycol (40) | Carnauba Wax | 0.7 | 2.6 | 2.1 | 3.0 | 218, 250 |
| 20 | Terephthalic Acid (100) | Ethylene Glycol (100) | Carnauba Wax | 0.9 | 1.5 | 1.2 | 3.0 | 255 |
| 21 | Terephthalic Acid (100) | Ethylene Glycol (100) | Carnauba Wax | 0.05 | 2.5 | 2.0 | 3.0 | 255 |
| 22 | Terephthalic Acid (100) | Ethylene Glycol (100) | Carnauba Wax | 1.2 | 0.9 | 0.7 | 3.0 | 255 |
| 23 | Terephthalic Acid (100) | Ethylene Glycol (100) | Carnauba Wax | 1.2 | 4.2 | 4.1 | 3.0 | 255 |
| 24 | Terephthalic Acid (88) Isophthalic Acid (12) | Ethylene Glycol (100) | Carnauba Wax | 1.2 | 2.5 | 2.0 | 0.1 | 226 |
| 25 | Terephthalic Acid (100) | Ethylene Glycol (100) | Carnauba Wax | 1.2 | 2.6 | 2.1 | 12.0 | 250 |
| 26 | Terephthalic Acid (80) Isophthalic Acid (20) | Ethylene Glycol (100) | Carnauba Wax | 0.8 | 1.5 | 1.2 | 3.0 | —*) |

Inner Surface Side of Can: Polyester Film (a2) (Lower Layer)

| | Kind of Resin | | Thickness | Melting Point |
|---|---|---|---|---|
| No. | Acid Component | Glycol Component | (μm) | [° C.] |
| 1 | Terephthalic Acid (100) | Ethylene Glycol (100) | 12.0 | 255 |
| 2 | Terephthalic Acid (100) | Ethylene Glycol (100) | 12.0 | 255 |
| 3 | Terephthalic Acid (100) | Ethylene Glycol (100) | 12.0 | 255 |
| 4 | Terephthalic Acid (100) | Ethylene Glycol (100) | 12.0 | 255 |
| 5 | Terephthalic Acid (100) | Ethylene Glycol (50) Butylene Glycol (50) | 12.0 | 220, 248 |
| 6 | Terephthalic Acid (100) | Ethylene Glycol (100) | 12.0 | 255 |
| 7 | Terephthalic Acid (100) | Ethylene Glycol (100) | 12.0 | 255 |
| 8 | Terephthalic Acid (100) | Ethylene Glycol (100) | 12.0 | 255 |
| 9 | Terephthalic Acid (100) | Ethylene Glycol (100) | 12.0 | 255 |
| 10 | Terephthalic Acid (100) | Ethylene Glycol (100) | 12.0 | 255 |
| 11 | Terephthalic Acid (100) | Ethylene Glycol (100) | 12.0 | 255 |
| 12 | Terephthalic Acid (100) | Ethylene Glycol (100) | 14.3 | 255 |
| 13 | Terephthalic Acid (100) | Ethylene Glycol (100) | 7.0 | 255 |
| 14 | Terephthalic Acid (100) | Ethylene Glycol (100) | 12.0 | 255 |
| 15 | Terephthalic Acid (100) | Ethylene Glycol (100) | 12.0 | 255 |
| 16 | Terephthalic Acid (90) Isophthalic Acid (10) | Ethylene Glycol (100) | 12.0 | 230 |
| 17 | Terephthalic Acid (87) Isophthalic Acid (13) | Ethylene Glycol (100) | 12.0 | 224 |
| 18 | Terephthalic Acid (87) Isophthalic Acid (13) | Ethylene Glycol (50) Butylene Glycol (50) | 12.0 | 224 |
| 19 | Terephthalic Acid (100) | Ethylene Glycol (60) Butylene Glycol (40) | 12.0 | 218, 250 |
| 20 | Terephthalic Acid (100) | Ethylene Glycol (100) | 12.0 | 255 |
| 21 | Terephthalic Acid (100) | Ethylene Glycol (100) | 12.0 | 255 |
| 22 | Terephthalic Acid (100) | Ethylene Glycol (100) | 12.0 | 255 |
| 23 | Terephthalic Acid (100) | Ethylene Glycol (100) | 12.0 | 255 |
| 24 | Terephthalic Acid (88) Isophthalic Acid (12) | Ethylene Glycol (100) | 14.9 | 226 |
| 25 | Terephthalic Acid (100) | Ethylene Glycol (100) | 3.0 | 255 |
| 26 | Terephthalic Acid (100) | Ethylene Glycol (100) | 12.0 | 255 |

*)Clear melting point was not detected.

TABLE 2

Outer Surface Side of Can: Polyester Film (b2) (Upper Layer)

| No. | Kind of Resin Acid Component | Kind of Resin Glycol Component | Thickness (μm) | Melting Point (° C.) |
|---|---|---|---|---|
| 1 | Terephthalic Acid (100) | Ethylene Glycol (100) | 12.0 | 255 |
| 2 | Terephthalic Acid (100) | Ethylene Glycol (100) | 12.0 | 255 |
| 3 | Terephthalic Acid (100) | Ethylene Glycol (100) | 12.0 | 255 |
| 4 | Terephthalic Acid (100) | Ethylene Glycol (100) | 12.0 | 255 |
| 5 | Terephthalic Acid (100) | Ethylene Glycol (50) Butylene Glycol (50) | 12.0 | 220, 248 |
| 6 | Terephthalic Acid (100) | Ethylene Glycol (100) | 12.0 | 255 |
| 7 | Terephthalic Acid (100) | Ethylene Glycol (100) | 12.0 | 255 |
| 8 | Terephthalic Acid (100) | Ethylene Glycol (100) | 12.0 | 255 |
| 9 | Terephthalic Acid (100) | Ethylene Glycol (100) | 12.0 | 255 |
| 10 | Terephthalic Acid (100) | Ethylene Glycol (100) | 12.0 | 255 |
| 11 | Terephthalic Acid (100) | Ethylene Glycol (100) | 12.0 | 255 |
| 12 | Terephthalic Acid (100) | Ethylene Glycol (100) | 12.0 | 255 |
| 13 | Terephthalic Acid (100) | Ethylene Glycol (100) | 12.0 | 255 |
| 14 | Terephthalic Acid (100) | Ethylene Glycol (100) | 12.0 | 255 |
| 15 | Terephthalic Acid (100) | Ethylene Glycol (100) | 12.0 | 255 |
| 16 | Terephthalic Acid (90) Isophthalic Acid (10) | Ethylene Glycol (100) | 12.0 | 230 |
| 17 | Terephthalic Acid (87) Isophthalic Acid (13) | Ethylene Glycol (100) | 12.0 | 224 |
| 18 | Terephthalic Acid (100) | Ethylene Glycol (50) Butylene Glycol (50) | 12.0 | 220, 248 |
| 19 | Terephthalic Acid (100) | Ethylene Glycol (60) Butylene Glycol (40) | 12.0 | 218, 250 |
| 20 | Terephthalic Acid (100) | Ethylene Glycol (100) | 12.0 | 255 |
| 21 | Terephthalic Acid (100) | Ethylene Glycol (100) | 12.0 | 255 |
| 22 | Terephthalic Acid (100) | Ethylene Glycol (100) | 12.0 | 255 |
| 23 | Terephthalic Acid (100) | Ethylene Glycol (100) | 12.0 | 255 |
| 24 | Terephthalic Acid (88) Isophthalic Acid (12) | Ethylene Glycol (100) | 12.0 | 226 |
| 25 | Terephthalic Acid (100) | Ethylene Glycol (100) | 12.0 | 255 |
| 26 | Terephthalic Acid (80) Isophthalic Acid (20) | Ethylene Glycol (100) | 12.0 | —*) |

*)Clear melting point was not detected.

TABLE 3

Outer Surface Side of Can: Resin Composition of Resin Layer (b1)

| | Polyester Resin (I-1) | | | Polyester Resin (I-2) | | | Polyester Resin (I-3) | | | Total Polyester |
|---|---|---|---|---|---|---|---|---|---|---|
| No. | Tg (° C.) | Molecular Weight | Amount Added (mass %) | Tg (° C.) | Molecular Weight | Amount Added (mass %) | Tg (° C.) | Molecular Weight | Amount Added (mass %) | Resin Amount Added (mass %) |
| 1 | 30 | 22000 | 38 | 60 | 10000 | 16 | 79 | 18000 | 14 | 68 |
| 2 | 30 | 22000 | 40 | 60 | 10000 | 15 | 79 | 18000 | 15 | 70 |
| 3 | 30 | 22000 | 41 | 60 | 10000 | 12 | 79 | 18000 | 16 | 69 |
| 4 | 30 | 22000 | 57 | 60 | 10000 | 0 | 79 | 18000 | 0 | 57 |
| 5 | 20 | 13000 | 0 | 60 | 10000 | 0 | 79 | 18000 | 68 | 68 |
| 6 | 20 | 13000 | 45 | 60 | 10000 | 20 | 79 | 18000 | 15 | 80 |
| 7 | 20 | 13000 | 43 | 60 | 10000 | 17 | 79 | 18000 | 12 | 72 |
| 8 | 20 | 13000 | 38 | 60 | 10000 | 15 | 79 | 18000 | 12 | 65 |
| 9 | 20 | 13000 | 52 | 60 | 10000 | 13 | 79 | 18000 | 5 | 70 |
| 10 | 20 | 13000 | 25 | 60 | 10000 | 26 | 79 | 18000 | 20 | 71 |
| 11 | 30 | 22000 | 38 | 60 | 10000 | 15 | 79 | 18000 | 16 | 69 |
| 12 | 30 | 22000 | 35 | 60 | 10000 | 17 | 79 | 18000 | 19 | 71 |
| 13 | 30 | 22000 | 42 | 60 | 10000 | 10 | 79 | 18000 | 12 | 64 |
| 14 | 30 | 22000 | 38 | 60 | 10000 | 20 | 79 | 18000 | 12 | 70 |
| 15 | 30 | 22000 | 39 | 60 | 10000 | 11 | 79 | 18000 | 21 | 71 |
| 16 | 30 | 22000 | 45 | 60 | 10000 | 12 | 79 | 18000 | 12 | 69 |
| 17 | 30 | 22000 | 35 | 60 | 10000 | 20 | 79 | 18000 | 11 | 66 |
| 18 | 30 | 22000 | 35 | 60 | 10000 | 15 | 79 | 18000 | 12 | 62 |
| 19 | 30 | 22000 | 39 | 60 | 10000 | 14 | 79 | 18000 | 12 | 65 |
| 20 | 30 | 22000 | 38 | 60 | 10000 | 20 | 79 | 18000 | 12 | 70 |
| 21 | 30 | 22000 | 38 | 60 | 10000 | 12 | 79 | 18000 | 12 | 62 |
| 22 | 30 | 22000 | 60 | 60 | 10000 | 0 | 79 | 18000 | 0 | 60 |
| 23 | 30 | 22000 | 35 | 60 | 10000 | 6 | 79 | 18000 | 12 | 53 |
| 24 | 30 | 22000 | 60 | 60 | 10000 | 12 | 79 | 18000 | 12 | 84 |
| 25 | 30 | 22000 | 0 | 60 | 10000 | 0 | 79 | 18000 | 60 | 60 |
| 26 | 30 | 22000 | 0 | 60 | 10000 | 0 | 79 | 18000 | 60 | 60 |

TABLE 4

| | Outer Surface Side of Can: Resin Composition of Resin Layer (b1) | | | | | | | | | | |
|---|---|---|---|---|---|---|---|---|---|---|---|
| | Phenol Resin (II) | | Metal Alkoxide Compound/Metal Chelate Compound (III) | | Epoxy Resin (IV) | | Polyamine/Polyamide Amine/Polyamide (V) | | Coloring Agent | | |
| No. | Kind | Amount Added (mass %) | Kind | Amount Added (mass %) | Kind | Amount Added (mass %) | Kind | Amount Added (mass %) | Kind | Content (PHR) | Thickness (μm) |
| 1 | Cresol-type Phenol | 20 | Titanium Octylene Glycol Chelate | 3.0 | Cresol Novolac-type Epoxy Resin | 5.0 | Modified Polyamide Amine | 4.0 | Pigment Yellow 180 | 1.0 | 1.3 |
| 2 | Cresol-type Phenol | 19 | Titanium Octylene Glycol Chelate | 3.0 | Cresol Novolac-type Epoxy Resin | 5.0 | Polyamine | 2.5 | — | 0.0 | 1.5 |
| 3 | Cresol-type Phenol | 21 | Titanium Octylene Glycol Chelate | 3.0 | Cresol Novolac-type Epoxy Resin | 4.0 | Modified Polyamide Amine | 3.0 | — | 0.0 | 0.8 |
| 4 | Cresol-type Phenol | 32 | Titanium Octylene Glycol Chelate | 3.0 | Cresol Novolac-type Epoxy Resin | 5.0 | Modified Polyamide Amine | 3.0 | — | 0.0 | 0.8 |
| 5 | Cresol-type Phenol | 22 | Titanium Octylene Glycol Chelate | 3.0 | Cresol Novolac-type Epoxy Resin | 4.5 | Modified Polyamide Amine | 2.5 | — | 0.0 | 2.0 |
| 6 | Cresol-type Phenol | 7 | Titanium Octylene Glycol Chelate | 3.0 | Cresol Novolac-type Epoxy Resin | 5.0 | Modified Polyamide Amine | 5.0 | — | 0.0 | 1.7 |
| 7 | Cresol-type Phenol | 18 | Zirconium Butoxide | 3.0 | Cresol Novolac-type Epoxy Resin | 5.0 | Modified Polyamide Amine | 2.0 | — | 0.0 | 1.8 |
| 8 | Cresol-type Phenol | 27 | Titanium Octylene Glycol Chelate | 0.2 | Cresol Novolac-type Epoxy Resin | 4.0 | Modified Polyamide Amine | 3.3 | Pigment Yellow 180 | 0.8 | 2.0 |
| 9 | Cresol-type Phenol | 19 | Titanium Octylene Glycol Chelate | 3.0 | Cresol Novolac-type Epoxy Resin | 5.0 | Modified Polyamide Amine | 3.0 | — | 0.0 | 1.5 |
| 10 | Cresol-type Phenol | 17 | Titanium Octylene Glycol Chelate | 3.0 | Cresol Novolac-type Epoxy Resin | 5.0 | Modified Polyamide Amine | 4.0 | — | 0.0 | 0.9 |
| 11 | Cresol-type Phenol | 21 | Titanium Octylene Glycol Chelate | 2.5 | Cresol Novolac-type Epoxy Resin | 5.0 | Polyamide | 2.5 | — | 0.0 | 1.5 |
| 12 | Cresol-type Phenol | 18 | Titanium Octylene Glycol Chelate | 3.0 | Cresol Novolac-type Epoxy Resin | 5.0 | Modified Polyamide Amine | 3.0 | — | 0.0 | 0.3 |
| 13 | Cresol-type Phenol | 21 | Titanium Octylene Glycol Chelate | 8.0 | Cresol Novolac-type Epoxy Resin | 3.0 | Modified Polyamide Amine | 4.0 | — | 0.0 | 1.5 |
| 14 | Cresol-type Phenol | 20 | Titanium Octylene Glycol Chelate | 3.0 | Cresol Novolac-type Epoxy Resin | 5.0 | Modified Polyamide Amine | 2.0 | — | 0.0 | 0.9 |
| 15 | Cresol-type Phenol | 18 | Titanium Butoxide | 3.0 | Cresol Novolac-type Epoxy Resin | 5.0 | Modified Polyamide Amine | 3.0 | — | 0.0 | 1.6 |
| 16 | Cresol-type Phenol | 24 | Titanium Octylene Glycol Chelate | 3.0 | Cresol Novolac-type Epoxy Resin | 1.0 | Polyamine | 2.5 | — | 0.0 | 1.6 |
| 17 | Cresol-type Phenol | 21 | Zirconium Acetylacetone Chelate | 3.0 | Cresol Novolac-type Epoxy Resin | 5.0 | Modified Polyamide Amine | 5.0 | — | 0.0 | 1.6 |
| 18 | Cresol-type Phenol | 20 | Titanium Octylene Glycol Chelate | 5.0 | Cresol Novolac-type Epoxy Resin | 4.0 | Modified Polyamide Amine | 9.0 | — | 0.0 | 1.6 |
| 19 | Cresol-type Phenol | 25 | Titanium Octylene Glycol Chelate | 5.0 | Cresol Novolac-type Epoxy Resin | 4.0 | Modified Polyamide Amine | 0.5 | — | 0.0 | 1.6 |
| 20 | Cresol-type Phenol | 20 | Titanium Octylene Glycol Chelate | 3.0 | Biphenyl-type Epoxy Resin | 5.0 | Modified Polyamide Amine | 2.0 | — | 0.0 | 0.9 |
| 21 | Cresol-type Phenol | 31 | Titanium Octylene Glycol Chelate | 0.0 | Cresol Novolac-type Epoxy Resin | 5.0 | Modified Polyamide Amine | 2.0 | Pigment Yellow 180 | 1.0 | 1.5 |
| 22 | Cresol-type Phenol | 40 | Titanium Octylene Glycol Chelate | 0.0 | Cresol Novolac-type Epoxy Resin | 0.0 | Modified Polyamide Amine | 0.0 | — | 0.0 | 1.5 |
| 23 | Cresol-type Phenol | 30 | Titanium Octylene Glycol Chelate | 6.0 | Cresol Novolac-type Epoxy Resin | 5.0 | Modified Polyamide Amine | 6.0 | Pigment Yellow 180 | 0.8 | 1.6 |
| 24 | Cresol-type Phenol | 11 | Titanium Octylene Glycol Chelate | 0.0 | Cresol Novolac-type Epoxy Resin | 5.0 | Modified Polyamide Amine | 0.0 | — | 0.0 | 1.6 |
| 25 | Cresol-type Phenol | 34 | Titanium Octylene Glycol Chelate | 3.0 | Cresol Novolac-type Epoxy Resin | 0.0 | Modified Polyamide Amine | 3.0 | — | 0.0 | 1.6 |
| 26 | Cresol-type Phenol | 34 | Titanium Octylene Glycol Chelate | 6.0 | Cresol Novolac-type Epoxy Resin | 0.0 | Modified Polyamide Amine | 0.0 | — | 0.0 | 1.6 |

TABLE 5

| | Laminate Manufacturing Condition | | | | | |
|---|---|---|---|---|---|---|
| | before Lamination | during Lamination | | | after Lamination | |
| No. | Film Surface Temperature (° C.) | Metal Sheet Surface Temperature (° C.) | Laminating Roll Surface Temperature (° C.) | Contact Time with Laminating Roll (ms) | Time before Quenching (s) | Quenching Water Temperature (° C.) |
| 1 | 140 | 263 | 90 | 15 | 1.0 | 70 |
| 2 | 140 | 269 | 100 | 15 | 1.0 | 70 |
| 3 | 160 | 262 | 130 | 11 | 2.5 | 70 |
| 4 | 140 | 261 | 90 | 15 | 1.0 | 70 |
| 5 | 145 | 260 | 100 | 15 | 1.0 | 70 |
| 6 | 140 | 253 | 85 | 16 | 1.0 | 70 |
| 7 | 120 | 247 | 80 | 20 | 0.9 | 70 |
| 8 | 140 | 277 | 100 | 15 | 1.0 | 70 |
| 9 | 145 | 280 | 110 | 15 | 1.0 | 70 |
| 10 | 140 | 263 | 90 | 15 | 1.0 | 70 |
| 11 | 140 | 263 | 90 | 15 | 1.0 | 70 |
| 12 | 140 | 269 | 105 | 15 | 1.0 | 70 |
| 13 | 140 | 263 | 90 | 15 | 1.0 | 70 |
| 14 | 140 | 263 | 90 | 15 | 1.0 | 70 |
| 15 | 140 | 269 | 100 | 15 | 1.0 | 70 |
| 16 | 145 | 260 | 100 | 15 | 1.0 | 70 |
| 17 | 160 | 262 | 100 | 15 | 1.0 | 70 |
| 18 | 120 | 267 | 75 | 20 | 0.9 | 70 |
| 19 | 140 | 261 | 90 | 15 | 1.0 | 70 |
| 20 | 140 | 277 | 105 | 13 | 1.0 | 70 |
| 21 | 140 | 263 | 90 | 15 | 1.0 | 70 |
| 22 | 150 | 297 | 120 | 12 | 2.0 | 70 |
| 23 | 140 | 242 | 130 | 12 | 1.5 | 70 |
| 24 | 140 | 269 | 100 | 15 | 1.0 | 70 |
| 25 | 140 | 261 | 90 | 15 | 1.0 | 70 |
| 26 | 140 | 277 | 100 | 15 | 1.0 | 70 |

(Evaluation of a Resin-Coated Metal Sheet for a Container)

The properties described below of the resin-coated metal sheet obtained as described above and the resin layers formed on the metal sheet were determined and evaluated. The method for determination and evaluation will be described hereafter.

(1) Determination of a Raman Band Intensity Ratio ($I_{MD}/I_{ND}$) of 1615 cm$^{-1}$ by Using Raman Spectroscopy By embedding the laminated steel sheet in an epoxy resin, by then performing wet polishing, a cross section parallel to the longitudinal direction was exposed. By defining a Raman band intensity of 1615 cm$^{-1}$ determined at intervals of 1 μm in the thickness direction from the surface of the uppermost resin layer (a1) by using a laser polarization plane parallel to the surface direction of the resin layer on the inner-surface side of a container as $I_{MD}$, by defining the value of a Raman band intensity of 1615 cm$^{-1}$ determined at intervals of 1 μm in the thickness direction from the surface of the uppermost resin layer (a1) by using a laser polarization plane perpendicular to the surface direction of the resin layer on the inner-surface side of a container as $I_{ND}$, and by calculating a ratio ($I_{MD}/I_{ND}$), the maximum and average values of the intensity ratio ($I_{MD}/I_{ND}$) were obtained. Here, by defining Raman band intensities ($I_{MD}$ and $I_{ND}$) of 1615 cm$^{-1}$ as the highest peak value of the Raman band within a range of 1615 cm$^{1}$±10 cm$^{-1}$, the Raman band intensity ratio ($I_{MD}/I_{ND}$) was derived by using the equation below.

$$I = I_{MD}/I_{ND}$$

$I_{MD}$: Raman band intensity of 1615 cm$^{-1}$ determined by using a polarization plane parallel to the longitudinal direction $I_{ND}$: Raman band intensity of 1615 cm$^{-1}$ determined by using a polarization plane parallel to the thickness direction (Determination Conditions)

Excitation light source: semiconductor laser (λ=530 nm)
Micrometer magnification ratio: ×100
Exposure time: 5 seconds
Repeat count of exposure: 2
Aperture: 25 μmφ

(2) Content Release Property

By using a drawing machine in a drawing process, cup forming was performed on the laminated metal sheet under conditions of a blank diameter of 100 mm and a drawing ratio (diameter before forming/diameter after forming) of 1.88. Subsequently, salted meat for luncheon meat (protein content in solid content: 60 mass %) was filled in the cup, a lid was then seamed, and a retort sterilization treatment was then performed (at a temperature of 130° C. for 90 minutes). Subsequently, by removing the lid, and by observing the amount of the retained contents in the cup when the cup was turned upside down in order to remove the contents, the degree of content release property was evaluated.

(Evaluation Criteria)

⊙: It was possible to take out the contents only by turning the cup upside down (without shaking the cup with a hand), and little extraneous matter was recognized when the inside of the cup was observed by performing a visual test after having took out the contents.

○: Although the contents were retained in the cup when the cup was only turned upside down, it was possible to remove the contents by shaking the cup up and down (for example, by shaking the cup with a hand). Little extraneous matter was recognized when the inside of the cup was observed by performing a visual test after having took out the contents.

x: It was difficult to remove the contents only by shaking the cup up and down (for example, by shaking the cup with a hand). After having forcibly removed the contents by markedly increasing the speed at which cup was shaken up and down or by using a tool such as a spoon, extraneous matter was clearly recognized when the inside of the cup was observed by performing a visual test.

(3) Formability

By applying wax to the resin-coated metal sheet, by then punching a disk having a diameter of 165 mm, a shallow-drawn can was obtained with a drawing ratio of 1.50. Subsequently, redrawing was performed on this drawn can with a drawing ratio of 1.80 and 2.00. Subsequently, by performing doming work by using ordinary methods followed by trimming, and by performing neck-in-flange work, a deep-drawn can was formed. By focusing on the neck-in portion of the deep-drawn can obtained as described above, the state in which film was subjected to the work was observed by performing a visual test.

(Evaluation Criteria)

⊚: Damage was not recognized in the film after forming has been performed.

○: Although forming was possible, partial color change was recognized in the film.

x: Forming was not possible due to fracturing in the can barrel.

(4) Retort-Blushing Resistance

The can bottom (on the outer-surface side of the can) of the can which was judged as formable (○ or better) in the evaluation of formability described above (3) was evaluated. By filling tap water having room temperature in the can, by then seaming a lid, the can was sealed. Subsequently, by placing the can with the can bottom side down in a steam-type retort sterilization furnace, a retort treatment was performed at a temperature of 125° C. for 90 minutes. After the treatment had been performed, a change in the appearance of the outer surface of the can bottom was observed.

(Evaluation Criteria)

⊚: No change in appearance was recognized.

○: A little cloudy appearance was recognized.

x: A white and cloudy appearance was recognized (the occurrence of whitening).

(5) Adhesiveness 1 after forming has been performed The can which was judged as formable (○ or better) in the evaluation of formability described above (3) was evaluated. By filling a mixed solution of 3 mass %-NaCl+3 mass % sodium citrate in the can, and by then seaming a lid, the can was sealed. Subsequently, after having performed a retort sterilization treatment at a temperature of 130° C. for 90 minutes, the can was stored in a thermostatic chamber having a temperature of 38° C. for 90 days. Subsequently, the can was opened in order to cut out a sample (having a width of 15 mm and a length of 120 mm) for a peeling test from the can barrel. A part of the film was peeled at the end of the long side of the cut-out sample. By opening the peeled film in the direction opposite to the direction of the peeled film (at an angle of 180°), and then by performing a peeling test by using a tensile test machine at a cross head speed of 30 mm/min., adhesive force per a width of 15 mm was evaluated. The can barrel portion of the inner surface of the can was evaluated.

(Evaluation Criteria)

⊚: 10.0 (N) or more

○: 5.0 (N) or more and less than 10.0 (N)

x: less than 5.0 (N)

(6) Adhesiveness 2 after forming has been performed The can which was judged as formable (○ or better) in the evaluation of formability described above (3) was evaluated. A sample (having a width of 15 mm and a length of 120 mm) for a peeling test was cut out from the can barrel. A part of the film was peeled at the end of the long side of the cut-out sample. By opening the peeled film in the direction opposite to the direction of the peeled film (at an angle of 180°), and then by performing a peeling test by using a tensile test machine at a cross head speed of 30 mm/min., adhesive force per a width of 15 mm was evaluated. The can barrel portion of the outer surface of the can was evaluated.

(Evaluation Criteria)

⊚: 10.0 (N) or more

○: 5.0 (N) or more and less than 10.0 (N)

x: less than 5.0 (N)

(7) Corrosion Resistance 1

The can which was judged as formable (○ or better) in the evaluation of formability described above (3) was evaluated. By filling commercially available ketchup (produced by KAGOME Co., Ltd.) in the can, and by then seaming a lid, the can was sealed. Subsequently, after having performed a retort sterilization treatment at a temperature of 130° C. for 90 minutes, the can was stored in a thermostatic chamber having a temperature of 38° C. for 90 days. Subsequently, by determining the concentration of iron which had been eluted in the content (ketchup), corrosion resistance was evaluated. The can barrel portion of the inner surface of the can was evaluated.

(Evaluation Criteria)

⊚: less than 1 mass ppm

○: 1 mass ppm or more and less than 10 mass ppm x: 10 mass ppm or more (8) Corrosion Resistance 2

Figure 3:
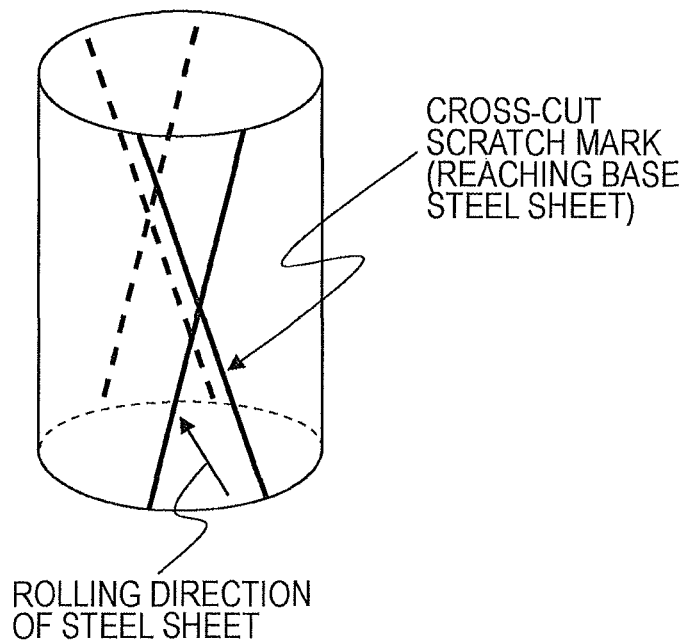
FIG. 3 is a diagram illustrating the position of cross-cut marks provided to a can body (Example 1).
Figure 4:
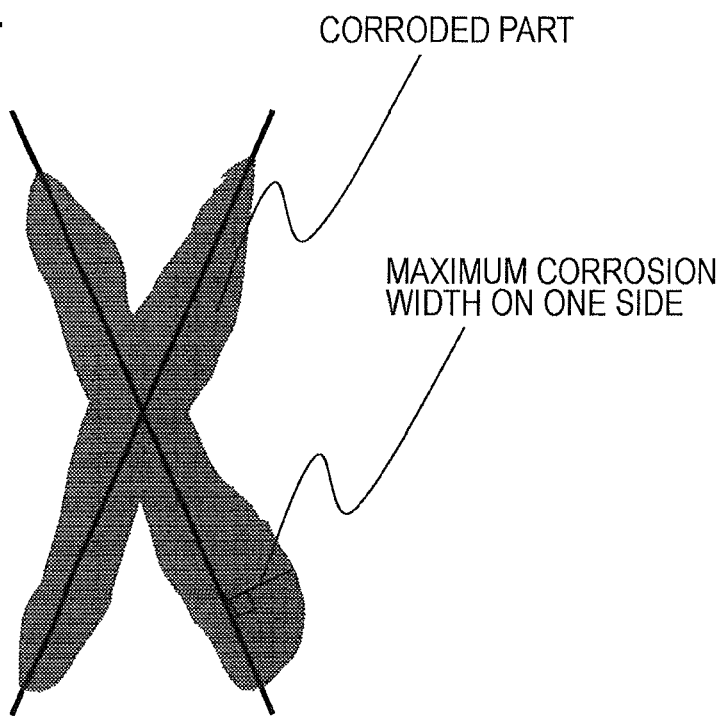
FIG. 4 is a diagram illustrating a method for determining a maximum corrosion width from an artificial scratch mark (Example 1).

The can which was judged as formable (○ or better) in the evaluation of formability described above (3) was evaluated. As illustrated in FIG. 3, a cross-cut scratch mark reaching the base steel sheet was provided to each of the two portions on the outer surface of the can barrel. Subsequently, by performing salt spray corrosion test on the can which had been provided with cross-cut scratch marks in accordance with JIS Z 2371 for 300 hours, the maximum corrosion width on one side from the scratch mark was determined. The determination method is illustrated in FIG. 4. The can barrel portion of the outer surface of the can was evaluated.

(Evaluation Criteria)

⊚: The maximum corrosion width on one side was less than 0.5 mm.

○: The maximum corrosion width on one side was 0.5 mm or more and less than 1.0 mm.

x: The maximum corrosion width on one side was 1.0 mm or more.

The results obtained as described above are given in Tables 6 and 7.

(9) Scratch Resistance when Forming Work is Performed

By applying wax to the resin-coated metal sheet, by then punching a disk having a diameter of 179 mm, a shallow-drawn can was obtained with a drawing ratio of 1.80. Subsequently, redrawing was performed on this drawn can with a drawing ratio of 2.40 and 3.00 in order to form a deep-drawn can. By focusing on the can barrel of the deep-drawn can obtained as described above, the state in which film was subjected to the work was observed by performing a visual test.

(Evaluation Criteria)

⊚: Damage was not recognized in the film after forming has been performed.

○: Although forming was possible, a partial small scratch was recognized in the film.

Δ: Although forming was possible, the steel sheet is partially exposed due to the occurrence of film shaving.

x: Forming was not possible due to fracturing in the can barrel.

(10) Printability

By applying a printing ink (printing ink CCST39 produced by TOYO INK CO., LTD.) to the surface of the resin layer which was to be on the outer-surface side of a container after container forming had been performed on the resin-coated metal sheet, and by then drying the ink, the thickness of the painted film was controlled to be 1.5 μm.

Subsequently, Cellotape (registered trademark) produced by NICHIBAN CO., LTD. was adhered to the painted surface and peeled at once.

By performing the test on ten samples, the number of samples whose ink were peeled was counted.

○: 0
Δ: 1 or more and 3 or less
x: 4 or more

TABLE 6

Property Evaluation Result on Inner Surface Side of Can

| No. | Content release property | Formability | Adhesiveness after Forming 1 | Corrosion Resistance 1 | Note |
|---|---|---|---|---|---|
| 1 | ⊙ | ⊙ | ⊙ | ⊙ | Example |
| 2 | ⊙ | ⊙ | ⊙ | ⊙ | Example |
| 3 | ⊙ | ⊙ | ⊙ | ⊙ | Example |
| 4 | ⊙ | ⊙ | ⊙ | ⊙ | Example |
| 5 | ⊙ | ⊙ | ⊙ | ⊙ | Example |
| 6 | ⊙ | ⊙ | ⊙ | ⊙ | Example |
| 7 | ○ | ○ | ○ | ⊙ | Example |
| 8 | ⊙ | ⊙ | ⊙ | ⊙ | Example |
| 9 | ⊙ | ⊙ | ⊙ | ○ | Example |
| 10 | ○ | ⊙ | ⊙ | ⊙ | Example |
| 11 | ⊙ | ⊙ | ○ | ○ | Example |
| 12 | ○ | ⊙ | ⊙ | ⊙ | Example |
| 13 | ⊙ | ○ | ○ | ○ | Example |
| 14 | ○ | ⊙ | ⊙ | ⊙ | Example |
| 15 | ○ | ⊙ | ⊙ | ⊙ | Example |
| 16 | ⊙ | ⊙ | ○ | ○ | Example |
| 17 | ⊙ | ⊙ | ○ | ○ | Example |
| 18 | ⊙ | ⊙ | ○ | ○ | Example |
| 19 | ⊙ | ⊙ | ⊙ | ⊙ | Example |
| 20 | ⊙ | ⊙ | ⊙ | ⊙ | Example |
| 21 | X | ⊙ | ⊙ | ⊙ | Comparative Example |
| 22 | ⊙ | ⊙ | X | X | Comparative Example |
| 23 | X | X | — | — | Comparative Example |
| 24 | X | ⊙ | ⊙ | ⊙ | Comparative Example |
| 25 | ⊙ | ○ | X | X | Comparative Example |
| 26 | ⊙ | ○ | X | X | Comparative Example |

TABLE 7

Property Evaluation Result on Outer Surface Side of Can

| No. | Retort-blushing Resistance | Adhesiveness after Forming 2 | Scratch Resistance | Printability | Corrosion Resistance 2 | Note |
|---|---|---|---|---|---|---|
| 1 | ⊙ | ⊙ | ○ | ○ | ⊙ | Example |
| 2 | ⊙ | ⊙ | ○ | ○ | ⊙ | Example |
| 3 | ⊙ | ⊙ | ○ | ○ | ⊙ | Example |
| 4 | ⊙ | ⊙ | ○ | ○ | ○ | Example |
| 5 | ⊙ | ⊙ | ○ | ○ | ⊙ | Example |
| 6 | ⊙ | ⊙ | ○ | ○ | ⊙ | Example |
| 7 | ⊙ | ⊙ | ○ | ○ | ⊙ | Example |
| 8 | ⊙ | ⊙ | ○ | ○ | ⊙ | Example |
| 9 | ⊙ | ⊙ | ○ | ○ | ⊙ | Example |
| 10 | ⊙ | ⊙ | ○ | ○ | ⊙ | Example |
| 11 | ⊙ | ⊙ | ○ | ○ | ⊙ | Example |
| 12 | ⊙ | ⊙ | ○ | ○ | ⊙ | Example |
| 13 | ⊙ | ⊙ | ○ | ○ | ⊙ | Example |
| 14 | ⊙ | ⊙ | ○ | ○ | ⊙ | Example |
| 15 | ⊙ | ⊙ | ○ | ○ | ⊙ | Example |
| 16 | ⊙ | ⊙ | ○ | ○ | ⊙ | Example |
| 17 | ⊙ | ⊙ | ○ | ○ | ⊙ | Example |
| 18 | ⊙ | ⊙ | ○ | ○ | ⊙ | Example |
| 19 | ⊙ | ⊙ | ○ | ○ | ⊙ | Example |
| 20 | ⊙ | ⊙ | ○ | ○ | ⊙ | Example |
| 21 | ○ | ⊙ | ○ | ○ | ○ | Comparative Example |
| 22 | ○ | ○ | ○ | ○ | ○ | Comparative Example |
| 23 | — | — | — | — | — | Comparative Example |
| 24 | ○ | ○ | ○ | ○ | ○ | Comparative Example |
| 25 | ○ | ○ | ○ | ○ | ⊙ | Comparative Example |
| 26 | ○ | ○ | ○ | ○ | ○ | Comparative Example |

As Tables 6 and 7 indicate, the examples of the present invention were excellent in terms of content release property and good in terms of other properties. In contrast, the comparative examples, which were out of the ranges according to the present invention, were poor in terms of any one of the properties including content release property.

Example 2

(Method for Manufacturing a Metal Sheet)

A metal sheet was manufactured by using the same method as that used in EXAMPLE 1.

(Method for Manufacturing a Film for a Resin Coating Layer on the Inner-Surface Side of a Container)

By mixing wax compounds into polyester resins which had been obtained by polymerizing the acid components and glycol components given in Table 8 in the amounts given in Table 8 in order to obtain resin compositions, by drying, melting, and extruding the resin compositions by using ordinary methods, by then cooling and solidifying the resin compositions on a cooling drum in order to obtain non-elongated films, and by then performing biaxial elongation and heat fixation, biaxially elongated polyester films (A) were obtained.

(Method for Manufacturing a Film for a Resin Coating Layer on the Outer-Surface Side of a Container)

By drying and melting polyester resins which had been obtained by polymerizing the acid components, the glycol components, and the wax compounds given in Table 9 in the amounts given in Table 9 by using ordinary methods, by performing co-extrusion by using a T-die, by then cooling and solidifying the resin compositions on a cooling drum in order to obtain non-elongated films, and by then performing biaxial elongation and heat fixation, biaxially elongated polyester films (b2) were obtained.

Subsequently, by dissolving various polyester resins, phenol resins, metal alkoxide-based compounds and/or metal chelate compounds, epoxy resins, polyamine resins, polyamide amine resins, polyamide resins, and coloring agents given in Tables 10 and 11 in a solvent formed by mixing toluene and methyl ethyl ketone in the amounts given in Tables 10 and 11, coating solutions were prepared.

Here, an example of a method for synthesizing a polyester resin (I-1) containing a repeating unit derived from diphenolic acid will be described. By charging acid components including 50 pts.mass of terephthalic acid, 112 pts.mass of isophthalic acid, and 4.9 pts.mass of diphenolic acid, and polyhydric alcohols including 50 pts.mass of 2-ethyl-2-butyl-1, 3-butanediol, 99 pts.mass of 1, 4-butanediol, 48 pts.mass of 1, 4-cyclohexanedimethanol, and 0.07 pts.mass of titanium tetrabutoxide into a 2 L flask, and by slowly heating the contents of the flask to a temperature of 220° C. over 4 hours in order to distill out water, an esterified compound was obtained. After distilling out a specified amount of water, heating the obtained compound to a temperature of 250° C. while performing reduced-pressure polymerization at a pressure of 10 mmHg over 30 minutes, and by subsequently performing late-stage polymerization at a pressure of 1 mm Hg or less over 50 minutes. Subsequently, by stopping reduced-pressure polymerization, by cooling the compound to a temperature of 220° C. in a nitrogen gas stream, by adding 1.9 pts.mass of trimellitic anhydride to the compound, by stirring the compound at a temperature of 220° C. for 30 minutes in order to perform carboxy group modification (post addition), and then by removing a resin, a polyester resin (I-1) having an average molecular weight of 22000, an acid value of 5 (mgKOH/g), and a glass-transition temperature of 30° C. was obtained. After this, by cooling the resin to a temperature of 60° C. or lower, and by diluting the resin in a mixed solution containing 50 mass % of methyl ethyl ketone and 50 mass % of toluene, the solution of the polyester resin (I-1) having a non-volatile content of 40% was obtained.

As a polyester resin (I-2), for example, VYLON GK-250 (having an average molecular weight of 10000 and a glass-transition temperature of 60° C. and produced by TOYOBO Co., Ltd.), which is a commercially available polyester resin, may be used. By diluting VYLON GK-250 in a mixed solution containing 50 mass % of methyl ethyl ketone and 50 mass % of toluene, the solution of the polyester resin (I-2) having a non-volatile content of 40% was obtained.

As a polyester resin (I-3), for example, VYLON GK-640 (having an average molecular weight of 18000 and a glass-transition temperature of 79° C. and produced by TOYOBO Co., Ltd.), which is a commercially available polyester resin, may be used. By diluting VYLON GK-250 in a mixed solution containing 50 mass % of methyl ethyl ketone and 50 mass % of toluene, the solution of the polyester resin (I-3) having a non-volatile content of 40% was obtained.

In addition, as a phenol resin (II), for example, TD2495 (p-cresol-type phenol resin, 50% normal butanol solution, produced by DIC Corporation), which is a commercially available article, was used.

As a metal chelate compound (III), for example, commercially available TC-200 (titanium octylene glycol chelate, produced by Matsumoto Fine Chemical Co., Ltd.) was used, and, as a metal alkoxide compound, commercially available ZA-65 (zirconium butoxide, produced by Matsumoto Fine Chemical Co., Ltd.) was used.

As an epoxy resin (IV), commercially available EPICLON N-660 (cresol novolac-type epoxy resin, 50% methyl ethyl ketone solution, produced by DIC Corporation) and commercially available YL6121H (biphenyl-type epoxy resin, produced by Mitsubishi Chemical Corporation) were used.

In addition, as a polyamine resin (V), commercially available EPICRON EXB-353 (produced by DIC Corporation) was used. As a polyamide amine resin, commercially available SUNMIDE 328A (produced by Air Products Japan Inc.) was used. As a polyamide resin, commercially available POLYMIDE L-15-3 produced by Sanyo Chemical Industries, Ltd. was used.

By applying the coating solution described above to the surface on one side of the biaxially oriented polyester film (b2) obtained as described above by using a gravure roll coater so that a specified dried film thickness was achieved, and by then drying the solution, the thickness of the dried resin layer (b1) was controlled. The drying temperature was 80° C. to 120° C.

(Method for Manufacturing a Resin-Coated Metal Sheet for a Container)

By using a laminating apparatus for a metal sheet illustrated in FIG. 1, the chromium-plated steel sheet 1 obtained as described above was heated with a metal sheet-heating device 2, and then a laminated polyester film (A), which was to be on the inner-surface side of a container after the container had been formed, was formed (thermal fusion bonding) on one side of the chromium-plated steel sheet 1 by using laminating rolls 3 while a laminated polyester film (B), which was to be on the outer-surface side of the container, was formed (thermal fusion bonding) on the other side.

When the laminated polyester film (A) was formed on the metal sheet, the surface temperature of the metal sheet was controlled to be equal to or higher than the Tm of a polyester resin layer (a1) included in the polyester film (A) and equal to or lower than the Tm+40° C. with the exception of some of the comparative examples. In addition, the surface temperature of the laminating rolls 3 was controlled to be equal to or higher than the Tg of the polyester film (A) and equal to or lower than the Tg+60° C., and the contact time with the metal sheet was controlled to be 10 msec to 15 msec. Here, there was little difference among the Tg's of the resins given in Table 1, and the Tg's were about 75° C. The lamination rolls 3 had an internal water-cooled system, and the temperature in a film adhesion process was controlled by circulating cooling water through the roll interior. The temperature of the resin layer before lamination was performed was controlled to be equal to or higher than (the Tg of the polyester film (A))+30° C. and equal to or lower than the Tg+100° C. so that the temperature distribution inside the cross section of the resin layer was uniform. Subsequently, by performing water cooling with a metal sheet-cooling device 5, a resin-coated metal sheet for a container was manufactured. The manufacturing conditions are given in Table 12.

The cross-sectional structures of the resin-coated metal sheet for a container manufactured as described above are illustrated in FIG. 2.

TABLE 8

| | Inner Surface Side of Can: Polyester Film (a1) (Upper Layer) | | | | | | | |
|---|---|---|---|---|---|---|---|---|
| | Kind of Resin | | Wax Compound | | Raman Band Intensity Ratio ($I_{MD}/I_{ND}$) | | Thickness | Melting Point |
| No. | Acid Component | Glycol Component | Kind | Content (mass %) | Maximum Value | Average Value | (μm) | [° C.] |
| 27 | Terephthalic Acid (100) | Ethylene Glycol (100) | Carnauba Wax | 0.9 | 2.4 | 2.3 | 3.0 | 255 |
| 28 | Terephthalic Acid (100) | Ethylene Glycol (100) | Carnauba Wax | 0.9 | 2.4 | 2.3 | 3.0 | 255 |
| 29 | Terephthalic Acid (100) | Ethylene Glycol (100) | Carnauba Wax | 0.9 | 2.4 | 2.3 | 3.0 | 255 |
| 30 | Terephthalic Acid (100) | Ethylene Glycol (100) | Carnauba Wax | 0.9 | 2.4 | 2.3 | 3.0 | 255 |
| 31 | Terephthalic Acid (100) | Ethylene Glycol (100) | Carnauba Wax | 0.8 | 1.5 | 1.0 | 3.0 | 255 |
| 32 | Terephthalic Acid (100) | Ethylene Glycol (100) | Carnauba Wax | 0.8 | 1.5 | 1.0 | 3.0 | 255 |
| 33 | Terephthalic Acid (100) | Ethylene Glycol (100) | Carnauba Wax | 0.8 | 1.5 | 1.0 | 3.0 | 255 |
| 34 | Terephthalic Acid (100) | Ethylene Glycol (100) | Carnauba Wax | 0.8 | 1.5 | 1.0 | 3.0 | 255 |
| 35 | Terephthalic Acid (100) | Ethylene Glycol (100) | Polyethylene Wax | 1.0 | 2.5 | 2.0 | 3.0 | 255 |
| 36 | Terephthalic Acid (90) Isophthalic Acid (10) | Ethylene Glycol (100) | Carnauba Wax | 0.9 | 2.7 | 2.3 | 3.0 | 230 |
| 37 | Terephthalic Acid (100) | Ethylene Glycol (100) | Carnauba Wax | 0.9 | 2.4 | 2.3 | 3.0 | 255 |
| 38 | Terephthalic Acid (100) | Ethylene Glycol (100) | Carnauba Wax | 0.8 | 2.2 | 1.5 | 3.0 | 255 |

| | Inner Surface Side of Can: Polyester Film (a2) (Lower Layer) | | | |
|---|---|---|---|---|
| | Kind of Resin | | Thickness | Melting Point |
| No. | Acid Component | Glycol Component | (μm) | [° C.] |
| 27 | Terephthalic Acid (100) | Ethylene Glycol (100) | 12.0 | 255 |
| 28 | Terephthalic Acid (100) | Ethylene Glycol (100) | 12.0 | 255 |
| 29 | Terephthalic Acid (100) | Ethylene Glycol (100) | 12.0 | 255 |
| 30 | Terephthalic Acid (100) | Ethylene Glycol (100) | 12.0 | 255 |
| 31 | Terephthalic Acid (100) | Ethylene Glycol (100) | 12.0 | 255 |
| 32 | Terephthalic Acid (100) | Ethylene Glycol (100) | 12.0 | 255 |
| 33 | Terephthalic Acid (100) | Ethylene Glycol (100) | 12.0 | 255 |
| 34 | Terephthalic Acid (100) | Ethylene Glycol (100) | 12.0 | 255 |
| 35 | Terephthalic Acid (100) | Ethylene Glycol (100) | 12.0 | 255 |
| 36 | Terephthalic Acid (90) Isophthalic Acid (10) | Ethylene Glycol (100) | 12.0 | 230 |
| 37 | Terephthalic Acid (100) | Ethylene Glycol (100) | 12.0 | 255 |
| 38 | Terephthalic Acid (87) Isophthalic Acid (13) | Ethylen Glycol (50) Butylene Glycol (50) | 12.0 | 224 |

*) Clear melting point was not detected.

TABLE 9

| | Outer Surface Side of Can: Polyester Film (b2) (Upper Layer) | | | | | |
|---|---|---|---|---|---|---|
| | Kind of Resin | | Wax Compound | | Thickness | Melting Point |
| No. | Acid Component | Glycol Component | Kind | Content (mass %) | (μm) | (° C.) |
| 27 | Terephthalic Acid (100) | Ethylene Glycol (100) | Carnauba Wax | 0.1 | 12.0 | 255 |
| 28 | Terephthalic Acid (100) | Ethylene Glycol (100) | Carnauba Wax | 1.0 | 12.0 | 255 |
| 29 | Terephthalic Acid (100) | Ethylene Glycol (100) | Carnauba Wax | 2.0 | 12.0 | 255 |

TABLE 9-continued

Outer Surface Side of Can: Polyester Film (b2) (Upper Layer)

| | Kind of Resin | | Wax Compound | | Thickness | Melting Point |
|---|---|---|---|---|---|---|
| No. | Acid Component | Glycol Component | Kind | Content (mass %) | (μm) | (° C.) |
| 30 | Terephthalic Acid (100) | Ethylene Glycol (100) | Carnauba Wax | 5.0 | 12.0 | 255 |
| 31 | Terephthalic Acid (100) | Ethylene Glycol (100) | Polyethylene Wax | 0.1 | 12.0 | 255 |
| 32 | Terephthalic Acid (100) | Ethylene Glycol (100) | Polyethylene Wax | 1.0 | 12.0 | 255 |
| 33 | Terephthalic Acid (100) | Ethylene Glycol (100) | Polyethylene Wax | 2.0 | 12.0 | 255 |
| 34 | Terephthalic Acid (100) | Ethylene Glycol (100) | Polyethylene Wax | 5.0 | 12.0 | 255 |
| 35 | Terephthalic Acid (100) | Ethylene Glycol (100) | Polyethylene Wax | 1.0 | 12.0 | 255 |
| 36 | Terephthalic Acid (90) Isophthalic Acid (10) | Ethylene Glycol (100) | Polypropylene | 1.0 | 12.0 | 230 |
| 37 | Terephthalic Acid (100) | Ethylene Glycol (100) | Carnauba Wax | 5.5 | 12.0 | 255 |
| 38 | Terephthalic Acid (96) Isophthalic Acid (4) | Ethylene Glycol (50) Butylene Glycol (50) | — | — | 12.0 | 216, 244 |

*) Clear melting point was not detected.

TABLE 10

Outer Surface Side of Can: Resin Composition of Resin Layer (b1)

| | Polyester Resin (I-1) | | | Polyester Resin (I-2) | | | Polyester Resin (I-3) | | | Total Polyester Resin |
|---|---|---|---|---|---|---|---|---|---|---|
| No. | Tg (° C.) | Molecular Weight | Amount Added (mass %) | Tg (° C.) | Molecular Weight | Amount Added (mass %) | Tg (° C.) | Molecular Weight | Amount Added (mass %) | Amount Added (mass %) |
| 27 | 30 | 22000 | 41 | 60 | 10000 | 12 | 79 | 18000 | 16 | 69 |
| 28 | 30 | 22000 | 41 | 60 | 10000 | 12 | 79 | 18000 | 16 | 69 |
| 29 | 30 | 22000 | 41 | 60 | 10000 | 12 | 79 | 18000 | 16 | 69 |
| 30 | 30 | 22000 | 41 | 60 | 10000 | 12 | 79 | 18000 | 16 | 69 |
| 31 | 20 | 13000 | 38 | 60 | 10000 | 15 | 79 | 18000 | 12 | 65 |
| 32 | 20 | 13000 | 38 | 60 | 10000 | 15 | 79 | 18000 | 12 | 65 |
| 33 | 20 | 13000 | 38 | 60 | 10000 | 15 | 79 | 18000 | 12 | 65 |
| 34 | 20 | 13000 | 38 | 60 | 10000 | 15 | 79 | 18000 | 12 | 65 |
| 35 | 30 | 22000 | 38 | 60 | 10000 | 20 | 79 | 18000 | 12 | 70 |
| 36 | 30 | 22000 | 45 | 60 | 10000 | 12 | 79 | 18000 | 12 | 69 |
| 37 | 30 | 22000 | 41 | 60 | 10000 | 12 | 79 | 18000 | 16 | 69 |
| 38 | 30 | 22000 | 35 | 60 | 10000 | 15 | 79 | 18000 | 12 | 62 |

TABLE 11

Outer Surface Side of Can: Resin Composition of Resin Layer (b1)

| | Phenol Resin (II) | | Metal Alkoxide Compound/ Metal Chelate Compound (III) | | Epoxy Resin (IV) | |
|---|---|---|---|---|---|---|
| No. | Kind | Amount Added (mass %) | Kind | Amount Added (mass %) | Kind | Amount Added (mass %) |
| 27 | Cresol-type Phenol | 21 | Titanium Octylene Glycol Chelate | 3.0 | Cresol Novolac-type Epoxy Resin | 4.0 |
| 28 | Cresol-type Phenol | 21 | Titanium Octylene Glycol Chelate | 3.0 | Cresol Novolac-type Epoxy Resin | 4.0 |
| 29 | Cresol-type Phenol | 21 | Titanium Octylene Glycol Chelate | 3.0 | Cresol Novolac-type Epoxy Resin | 4.0 |
| 30 | Cresol-type Phenol | 21 | Titanium Octylene Glycol Chelate | 3.0 | Cresol Novolac-type Epoxy Resin | 4.0 |
| 31 | Cresol-type Phenol | 27 | Titanium Octylene Glycol Chelate | 0.2 | Cresol Novolac-type Epoxy Resin | 4.0 |
| 32 | Cresol-type Phenol | 27 | Titanium Octylene Glycol Chelate | 0.2 | Cresol Novolac-type Epoxy Resin | 4.0 |
| 33 | Cresol-type Phenol | 27 | Titanium Octylene Glycol Chelate | 0.2 | Cresol Novolac-type Epoxy Resin | 4.0 |
| 34 | Cresol-type Phenol | 27 | Titanium Octylene Glycol Chelate | 0.2 | Cresol Novolac-type Epoxy Resin | 4.0 |
| 35 | Cresol-type Phenol | 20 | Titanium Octylene Glycol Chelate | 3.0 | Cresol Novolac-type Epoxy Resin | 5.0 |
| 36 | Cresol-type Phenol | 24 | Titanium Octylene Glycol Chelate | 3.0 | Cresol Novolac-type Epoxy Resin | 1.0 |
| 37 | Cresol-type Phenol | 21 | Titanium Octylene Glycol Chelate | 3.0 | Cresol Novolac-type Epoxy Resin | 4.0 |

TABLE 11-continued

| | | | | | |
|---|---|---|---|---|---|
| 38 | Cresol-type Phenol | 20 | Titanium Octylene Glycol Chelate | 5.0 | Cresol Novolac-type Epoxy Resin | 4.0 |

Outer Surface Side of Can: Resin Composition of Resin Layer (b1)

| No. | Polyamine/Polyamide Amine/Polyamide (V) Kind | Amount Added (mass %) | Coloring Agent Kind | Content (PHR) | Thickness (μm) |
|---|---|---|---|---|---|
| 27 | Modified Polyamide Amine | 3.0 | — | 0.0 | 0.8 |
| 28 | Modified Polyamide Amine | 3.0 | — | 0.0 | 0.8 |
| 29 | Modified Polyamide Amine | 3.0 | — | 0.0 | 0.8 |
| 30 | Modified Polyamide Amine | 3.0 | — | 0.0 | 0.8 |
| 31 | Modified Polyamide Amine | 3.3 | Pigment Yellow 180 | 0.8 | 2.0 |
| 32 | Modified Polyamide Amine | 3.3 | Pigment Yellow 180 | 0.8 | 2.0 |
| 33 | Modified Polyamide Amine | 3.3 | Pigment Yellow 180 | 0.8 | 2.0 |
| 34 | Modified Polyamide Amine | 3.3 | Pigment Yellow 180 | 0.8 | 2.0 |
| 35 | Modified Polyamide Amine | 2.0 | — | 0.0 | 0.9 |
| 36 | Polyamine | 2.5 | — | 0.0 | 1.6 |
| 37 | Modified Polyamide Amine | 3.0 | — | 0.0 | 0.8 |
| 38 | Modified Polyamide Amine | 9.0 | — | 0.0 | 1.6 |

TABLE 12

| | Laminate Manufacturing Condition | | | | | |
|---|---|---|---|---|---|---|
| | before Lamination | during Lamination | | | after Lamination | |
| No. | Film Surface Temperature (° C.) | Metal Sheet Surface Temperature (° C.) | Laminating Roll Surface Temperature (° C.) | Contact Time with Laminating Roll (ms) | Time before Quenching (s) | Quenching Water Temperature (° C.) |
| 27 | 160 | 262 | 130 | 11 | 2.5 | 70 |
| 28 | 160 | 262 | 130 | 11 | 2.5 | 70 |
| 29 | 160 | 262 | 130 | 11 | 2.5 | 70 |
| 30 | 160 | 262 | 130 | 11 | 2.5 | 70 |
| 31 | 140 | 277 | 100 | 15 | 1.0 | 70 |
| 32 | 140 | 277 | 100 | 15 | 1.0 | 70 |
| 33 | 140 | 277 | 100 | 15 | 1.0 | 70 |
| 34 | 140 | 277 | 100 | 15 | 1.0 | 70 |
| 35 | 140 | 263 | 90 | 15 | 1.0 | 70 |
| 36 | 145 | 260 | 100 | 15 | 1.0 | 70 |
| 37 | 160 | 262 | 130 | 11 | 2.5 | 70 |
| 38 | 120 | 267 | 75 | 20 | 0.9 | 70 |

(Evaluation of a Resin-Coated Metal Sheet for a Container)

The properties described below of the resin-coated metal sheet obtained as described above and the resin layers formed on the metal sheet were determined and evaluated. The method for determination and evaluation was the same as that used in EXAMPLE 1.

(1) Raman band intensity ratio ($I_{MD}/I_{ND}$) of 1615 cm$^{-1}$ by using Raman spectroscopy
(2) Content release property
(3) Formability
(4) Retort-blushing resistance
(5) Adhesiveness 1 after forming has been performed
(6) Adhesiveness 2 after forming has been performed
(7) Corrosion resistance 1
(8) Corrosion resistance 2
(9) Scratch resistance when forming work is performed
(10) Printability

TABLE 13

Property Evaluation Result on Inner Surface Side of Can

| No. | Content release property | Formability | Adhesiveness after Forming 1 | Corrosion Resistance 1 | Note |
|---|---|---|---|---|---|
| 27 | ⊙ | ⊙ | ⊙ | ⊙ | Example |
| 28 | ⊙ | ⊙ | ⊙ | ⊙ | Example |
| 29 | ⊙ | ⊙ | ⊙ | ⊙ | Example |
| 30 | ⊙ | ⊙ | ⊙ | ⊙ | Example |
| 31 | ⊙ | ⊙ | ⊙ | ⊙ | Example |
| 32 | ⊙ | ⊙ | ⊙ | ⊙ | Example |
| 33 | ⊙ | ⊙ | ⊙ | ⊙ | Example |
| 34 | ⊙ | ⊙ | ⊙ | ⊙ | Example |
| 35 | ○ | ⊙ | ⊙ | ⊙ | Example |
| 36 | ⊙ | ⊙ | ○ | ○ | Example |
| 37 | ⊙ | ⊙ | ⊙ | ⊙ | Example |
| 38 | ⊙ | ⊙ | ○ | ○ | Example |

TABLE 14

Property Evaluation Result on Outer Surface Side of Can

| No. | Retort-blushing Resistance | Adhesiveness after Forming 2 | Corrosion Resistance 2 | Scratch Resistance | Printability | Note |
|---|---|---|---|---|---|---|
| 27 | ⊙ | ⊙ | ⊙ | ⊙ | ○ | Example |
| 28 | ⊙ | ⊙ | ⊙ | ⊙ | ○ | Example |
| 29 | ⊙ | ⊙ | ⊙ | ⊙ | ○ | Example |
| 30 | ⊙ | ⊙ | ⊙ | ⊙ | ○ | Example |
| 31 | ⊙ | ⊙ | ⊙ | ⊙ | ○ | Example |
| 32 | ⊙ | ⊙ | ⊙ | ⊙ | ○ | Example |
| 33 | ⊙ | ⊙ | ⊙ | ⊙ | ○ | Example |
| 34 | ⊙ | ⊙ | ⊙ | ⊙ | ○ | Example |
| 35 | ⊙ | ⊙ | ⊙ | ⊙ | ○ | Example |
| 36 | ⊙ | ⊙ | ⊙ | ⊙ | ○ | Example |
| 37 | ○ | ○ | ○ | ⊙ | Δ | Example |
| 38 | ⊙ | ⊙ | ⊙ | ○ | ○ | Example |

As Tables 13 and 14 indicates, the examples of the present invention were excellent in terms of content release property and good in terms of other properties. In particular, in the case of Nos. 27 through 36 where appropriate amounts of wax are contained in the resin layer which is to be on the outer-surface side of the container, scratch resistance is excellent to a higher degree. No. 37 is the example of the present invention in which the wax content in the resin layer which is to be on the outer-surface side of the container is more than the preferable range according to the present invention. Although there is no problem in using the resin layer, No. 37 is a little poorer in terms of printability than Nos. 27 through 36.

The resin-coated metal sheet for a container according to the present invention can preferably be used in applications for a container and packing in which excellent content release property is required. In addition, it is possible to use the resin-coated metal sheet as a material for a container which is manufactured by performing drawing or the like, in particular, for a food can.

REFERENCE SIGNS LIST

1 metal sheet (chromium-plated steel sheet)
2 metal sheet-heating device
3 laminating roll
4a polyester resin layer (A)
4b polyester resin layer (B)
5 metal sheet-cooling device

The invention claimed is:

1. A resin-coated metal sheet for a container, comprising a metal sheet and a resin layer (A) having a multi-layer structure containing polyester as a main component on an inner-surface side of the container when the metal sheet is formed into the container, wherein
   1) the resin layer (A) contains terephthalic acid in an amount of 85 mol % or more,
   2) the resin layer (A) has at least two layers including an uppermost resin layer (a1) which comes into contact with contents and contains wax compounds in an amount of 0.10 mass % or more and 2.0 mass % or less with respect to the uppermost resin layer (a1), the wax compounds containing a carnauba wax,
   3) with respect to a Raman band of 1615 $cm^{-1}$ determined by performing Raman spectroscopy on the uppermost resin layer (a1), a maximum value of a peak intensity ratio ($I_{MD}/I_{ND}$) of peak intensity ($I_{MD}$) in a longitudinal direction to peak intensity ($I_{ND}$) in a thickness direction is 1.0 or more and 4.0 or less,
   4) the uppermost resin layer (a1) has a thickness of 0.5 μm or more and 10 μm or less, and
   5) the resin layer (A) excluding the thickness of the uppermost resin layer (a1) has a thickness of 5 μm or more and 20 μm or less.

2. The resin-coated metal sheet for a container according to claim 1, further comprising a resin layer (B) having a multi-layer structure containing polyester as a main component on an outer-surface side of the container when the metal sheet is formed into the container, wherein a resin layer (b1) which comes into contact with the metal sheet contains components described in (I) through (V) below:
   (I) a polyester resin,
   (II) a phenol resin,
   (III) a metal alkoxide-based compound and/or metal chelate compound,
   (IV) an epoxy resin, and
   (V) at least one selected from the group consisting of a polyamine resin, a polyamide amine resin, and a polyamide resin.

3. The resin-coated metal sheet for a container according to claim 2, wherein the resin layer (B) has the resin layer (b1) and a polyester film (b2) formed on the resin layer (b1).

4. The resin-coated metal sheet for a container according to claim 3, wherein contents of the resin components of the resin layer (b1) satisfy the conditions below:
   (I) polyester resin: 50 mass % or more and 89 mass % or less, (II) phenol resin: 10 mass % or more and 45 mass % or less,
(III) metal alkoxide-based compound and/or metal chelate compound: 0.01 mass % or more and 10 mass % or less,
(IV) epoxy resin: 0.5 mass % or more and 20 mass % or less, and
(V) at least one selected from the group consisting of a polyamine resin, a polyamide amine resin, and a polyamide resin: 0.1 mass % or more and 10 mass % or less.

5. The resin-coated metal sheet for a container according to claim 3, wherein the resin layer (B) contains wax compounds in an amount of 5.0 mass % or less with respect to the resin layer (B).

6. The resin-coated metal sheet for a container according to claim 3, wherein
a resin in the resin layer (b2) is a composition derived by mixing a polyester (i) containing polyethylene terephthalate or copolymerized polyethylene terephthalate containing less than 6 mol % of copolymerization components and a polyester (ii) containing polybutylene terephthalate or copolymerized polybutylene terephthalate containing less than 5 mol % of copolymerization components, and
a content of the polyester (i) is 60 mass % or less and a content of the polyester (ii) is 40 mass % or more.

7. The resin-coated metal sheet for a container according to claim 6, wherein the resin layer (B) contains wax compounds in an amount of 5.0 mass % or less with respect to the resin layer (B).

8. The resin-coated metal sheet for a container according to claim 2, wherein contents of the resin components of the resin layer (b1) satisfy the conditions below:
(I) polyester resin: 50 mass % or more and 89 mass % or less,
(II) phenol resin: 10 mass % or more and 45 mass % or less,
(III) metal alkoxide-based compound and/or metal chelate compound: 0.01 mass % or more and 10 mass % or less,
(IV) epoxy resin: 0.5 mass % or more and 20 mass % or less, and
(V) at least one selected from the group consisting of a polyamine resin, a polyamide amine resin, and a polyamide resin: 0.1 mass % or more and 10 mass % or less.

9. The resin-coated metal sheet for a container according to claim 8, wherein
a resin in the resin layer (b2) is a composition derived by mixing a polyester (i) containing polyethylene terephthalate or copolymerized polyethylene terephthalate containing less than 6 mol % of copolymerization components and a polyester (ii) containing polybutylene terephthalate or copolymerized polybutylene terephthalate containing less than 5 mol % of copolymerization components, and
a content of the polyester (i) is 60 mass % or less and a content of the polyester (ii) is 40 mass % or more.

10. The resin-coated metal sheet for a container according to claim 8, wherein the resin layer (B) contains wax compounds in an amount of 5.0 mass % or less with respect to the resin layer (B).

11. The resin-coated metal sheet for a container according to claim 2, wherein the resin layer (B) contains wax compounds in an amount of 5.0 mass % or less with respect to the resin layer (B).

12. The resin-coated metal sheet for a container according to claim 11, wherein
in the resin layer (B), the resin layer (b1) excluding the uppermost layer and the uppermost resin layer (b2) contain wax compounds or the uppermost resin layer (b2) contains wax compounds, and
the uppermost resin layer (b2) contains wax compounds in an amount of 5.0 mass % or less with respect to the uppermost resin layer (b2).

13. The resin-coated metal sheet for a container according to claim 11, wherein the wax compounds contain a carnauba wax.

14. The resin-coated metal sheet for a container according to claim 12, wherein the wax compounds contain a carnauba wax.

15. A method for manufacturing the resin-coated metal sheet for a container according to claim 1, the method comprising determining resin layer forming conditions such that, with respect to a Raman band of 1615 $cm^{-1}$ determined by performing Raman spectroscopy on the uppermost resin layer (a1), a maximum value of a ratio ($I_{MD}/I_{ND}$) of peak intensity ($I_{MD}$) in a longitudinal direction to peak intensity ($I_{ND}$) in a thickness direction is 1.0 or more and 4.0 or less.

16. A method for manufacturing the resin-coated metal sheet for a container according to claim 2, the method comprising determining resin layer forming conditions such that, with respect to a Raman band of 1615 $cm^{-1}$ determined by performing Raman spectroscopy on the uppermost resin layer (a1), a maximum value of a ratio ($I_{MD}/I_{ND}$) of peak intensity ($I_{ND}$) in a longitudinal direction to peak intensity ($I_{ND}$) in a thickness direction is 1.0 or more and 4.0 or less.

17. A method for manufacturing the resin-coated metal sheet for a container according to claim 3, the method comprising determining resin layer forming conditions such that, with respect to a Raman band of 1615 $cm^{-1}$ determined by performing Raman spectroscopy on the uppermost resin layer (a1), a maximum value of a ratio ($I_{MD}/I_{ND}$) of peak intensity ($I_{MD}$) in a longitudinal direction to peak intensity ($I_{ND}$) in a thickness direction is 1.0 or more and 4.0 or less.

18. A method for manufacturing the resin-coated metal sheet for a container according to claim 8, the method comprising determining resin layer forming conditions such that, with respect to a Raman band of 1615 $cm^{-1}$ determined by performing Raman spectroscopy on the uppermost resin layer (a1), a maximum value of a ratio ($I_{ND}/I_{ND}$) of peak intensity ($I_{MD}$) in a longitudinal direction to peak intensity ($I_{ND}$) in a thickness direction is 1.0 or more and 4.0 or less.

19. A method for manufacturing the resin-coated metal sheet for a container according to claim 6, the method comprising determining resin layer forming conditions such that, with respect to a Raman band of 1615 $cm^{-1}$ determined by performing Raman spectroscopy on the uppermost resin layer (a1), a maximum value of a ratio ($I_{MD}/I_{ND}$) of peak intensity ($I_{MD}$) in a longitudinal direction to peak intensity ($I_{ND}$) in a thickness direction is 1.0 or more and 4.0 or less.

20. A method for manufacturing the resin-coated metal sheet for a container according to claim 11, the method comprising determining resin layer forming conditions such that, with respect to a Raman band of 1615 $cm^{-1}$ determined by performing Raman spectroscopy on the uppermost resin layer (a1), a maximum value of a ratio ($I_{MD}/I_{ND}$) of peak intensity ($I_{MD}$) in a longitudinal direction to peak intensity ($I_{ND}$) in a thickness direction is 1.0 or more and 4.0 or less.

21. A method for manufacturing the resin-coated metal sheet for a container according to claim 12, the method comprising determining resin layer forming conditions such that, with respect to a Raman band of 1615 $cm^{-1}$ determined by performing Raman spectroscopy on the uppermost resin layer (a1), a maximum value of a ratio ($I_{MD}/I_{ND}$) of peak intensity ($I_{MD}$) in a longitudinal direction to peak intensity ($I_{ND}$) in a thickness direction is 1.0 or more and 4.0 or less.

22. A method for manufacturing the resin-coated metal sheet for a container according to claim 13, the method comprising determining resin layer forming conditions such that, with respect to a Raman band of 1615 cm$^{-1}$ determined by performing Raman spectroscopy on the uppermost resin layer (a1), a maximum value of a ratio ($I_{MD}/I_{ND}$) of peak intensity ($I_{MD}$) in a longitudinal direction to peak intensity ($I_{ND}$) in a thickness direction is 1.0 or more and 4.0 or less.

* * * * *